US012634456B2

(12) United States Patent
Kim et al.

(10) Patent No.: US 12,634,456 B2
(45) Date of Patent: May 19, 2026

(54) METHOD AND DEVICE FOR HIGH-LEVEL IMAGE SEGMENTATION AND IMAGE ENCODING/DECODING

(71) Applicant: HANWHA VISION CO., LTD., Seongnam-si (KR)

(72) Inventors: Jae Gon Kim, Goyang-si (KR); Ji Hoon Do, Busan (KR); Do Heon Park, Goyang-si (KR); Yong Uk Yoon, Jeju-si (KR)

(73) Assignee: HANWHA VISION CO., LTD., Seongnam-si (KR)

( * ) Notice: Subject to any disclaimer, the term of this patent is extended or adjusted under 35 U.S.C. 154(b) by 0 days.

(21) Appl. No.: 18/904,825

(22) Filed: Oct. 2, 2024

(65) Prior Publication Data

US 2025/0024037 A1 Jan. 16, 2025

Related U.S. Application Data

(63) Continuation of application No. 17/631,999, filed as application No. PCT/KR2020/010593 on Aug. 11, 2020, now Pat. No. 12,149,688.

(30) Foreign Application Priority Data

Aug. 12, 2019 (KR) ........................ 10-2019-0098337
Oct. 8, 2019 (KR) ........................ 10-2019-0124931
(Continued)

(51) Int. Cl.
*H04N 19/119* (2014.01)
*H04N 19/174* (2014.01)
(Continued)

(52) U.S. Cl.
CPC ......... *H04N 19/119* (2014.11); *H04N 19/174* (2014.11); *H04N 19/46* (2014.11); (Continued)

(58) Field of Classification Search
None
See application file for complete search history.

(56) References Cited

U.S. PATENT DOCUMENTS 12,149,688 B2 * 11/2024 Kim ..................... H04N 19/172
2014/0086333 A1 * 3/2014 Wang ................... H04N 21/235
375/240.26

(Continued)

FOREIGN PATENT DOCUMENTS

CN 102474609 A 5/2012
EP 2003643 B1 * 2/2014 ........... G10L 9/0212
(Continued)

OTHER PUBLICATIONS

Chinese Office Action Issued on Jan. 18, 2025, in counterpart Chinese Patent Application No. 202080057189.1 (13 Pages in English, 8 Pages in Chinese).
(Continued)

*Primary Examiner* — David N Werner
(74) *Attorney, Agent, or Firm* — NSIP Law

(57) ABSTRACT

The present invention provides a method and device wherein segmentation information for a current picture is encoded/decoded, and the current picture is segmented into at least one of sub-picture units, slice units, and tile units according to the encoded/decoded segmentation information.

11 Claims, 9 Drawing Sheets

(30)       Foreign Application Priority Data

| | | |
|---|---|---|
| Jan. 13, 2020 | (KR) | .......................... 10-2020-0004469 |
| Mar. 31, 2020 | (KR) | .......................... 10-2020-0039405 |

(51) Int. Cl.

| | |
|---|---|
| *H04N 19/176* | (2014.01) |
| *H04N 19/46* | (2014.01) |
| *H04N 19/70* | (2014.01) |
| *H04N 19/129* | (2014.01) |
| *H04N 19/61* | (2014.01) |

(52) U.S. Cl.
CPC ........... *H04N 19/70* (2014.11); *H04N 19/129* (2014.11); *H04N 19/176* (2014.11); *H04N 19/61* (2014.11)

(56)       References Cited

U.S. PATENT DOCUMENTS

| | | | |
|---|---|---|---|
| 2015/0195574 A1* | 7/2015 | Yu ........................... | H04N 19/70 |
| | | | 375/240.2 |
| 2017/0094277 A1* | 3/2017 | Chen ..................... | H04N 19/124 |
| 2017/0244977 A1 | 8/2017 | Esenlik et al. | |
| 2017/0347108 A1 | 11/2017 | Maaninen | |
| 2019/0281285 A1* | 9/2019 | Piao ...................... | H04N 19/176 |
| 2022/0109855 A1* | 4/2022 | Wang ..................... | H04N 19/70 |
| 2022/0116602 A1* | 4/2022 | Okawa .................. | H04N 19/176 |

FOREIGN PATENT DOCUMENTS

| | | | |
|---|---|---|---|
| KR | 10-2017-0113384 | A | 10/2017 |
| KR | 10-2017-0136654 | A | 12/2017 |
| KR | 10-2018-0129584 | A | 12/2018 |
| KR | 10-2019-0024212 | A | 3/2019 |
| KR | 10-2019-0068517 | A | 6/2019 |
| WO | WO 2016/203981 | A1 | 12/2016 |

OTHER PUBLICATIONS

M.M. Hannuksela, Y.K. Wang, & M. Gabbouj, "Isolated Regions in Video Coding", 6 IEEE Transactions on Multimedia 259-267 (Apr. 2004) (Year: 2004).

Lambert, Peter, et al. "Flexible macroblock ordering in H. 264/AVC." Journal of Visual Communication and Image Representation 17.2 (Aug. 2005): 358-375.

Schwarz, Heiko, et al. "Block structures and parallelism features in HEVC." High Efficiency Video Coding (HEVC) Algorithms and Architectures (2014): 49-90.

JVET Document No. Q0244 (Jan. 2020) (Year: 2020).

JVET Document No. Q2001 (excerpts) (Jan. 2020) (Year: 2020).

Indian Office Action issued on Nov. 3, 2023, in counterpart Indian Patent Application No. 202217011939 (8 pages).

Korean Office Action issued on Feb. 6, 2026, in counterpart Korean Patent Application No. 10-2020-0100288 (8 pages in English, 8 pages in Korean).

\* cited by examiner

【FIG. 1】
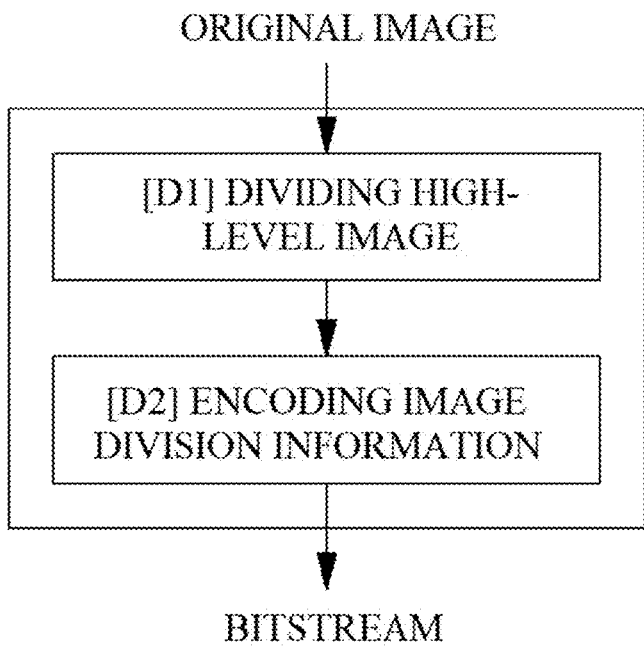

【FIG. 2】
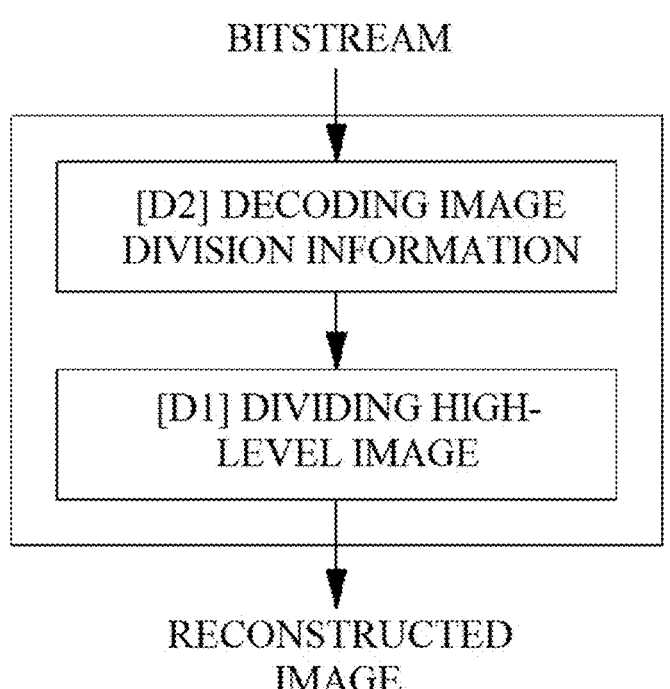

[FIG. 3]
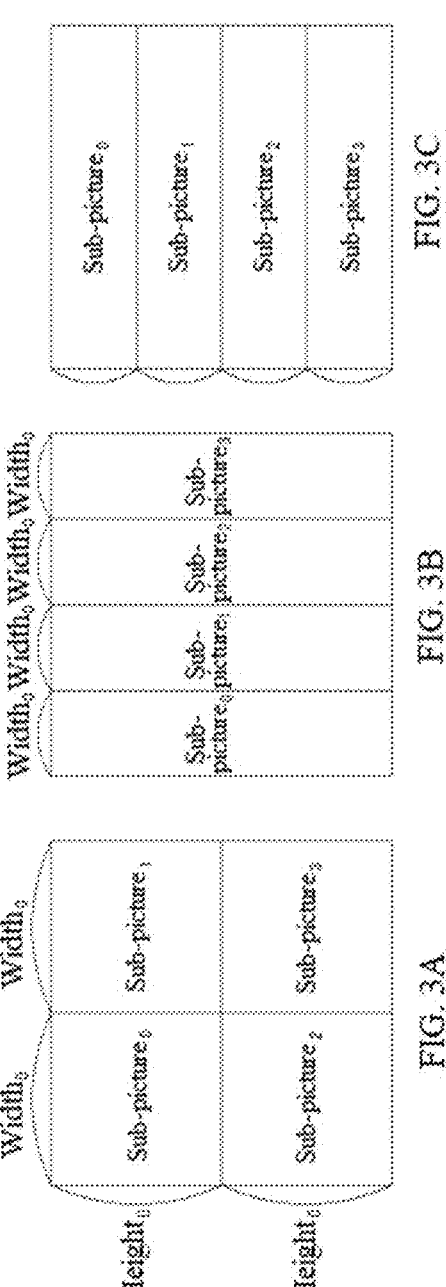

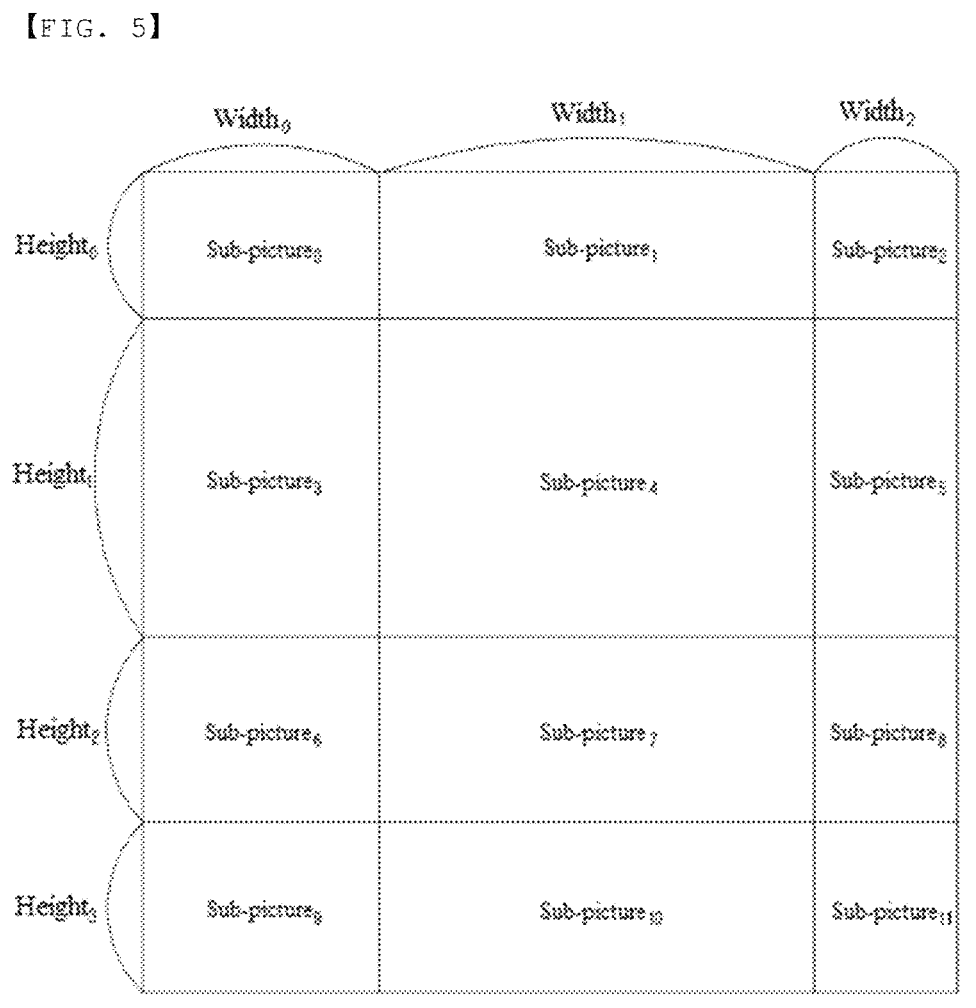

[FIG. 8]
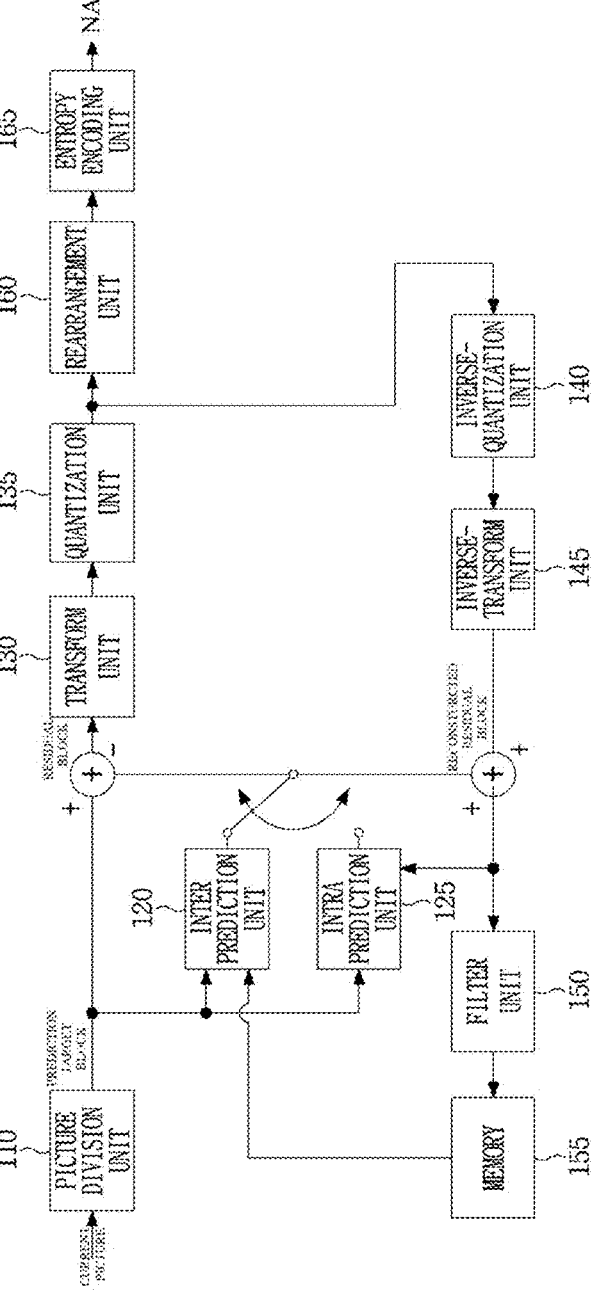

[FIG. 9]
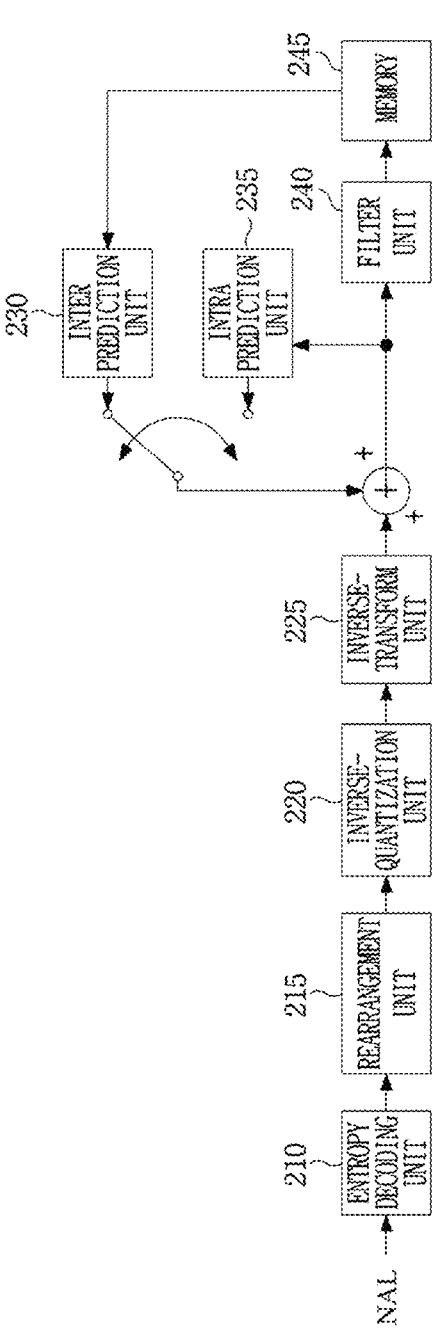

METHOD AND DEVICE FOR HIGH-LEVEL IMAGE SEGMENTATION AND IMAGE ENCODING/DECODING

CROSS REFERENCE TO RELATED APPLICATIONS

This application is a continuation of application Ser. No. 17/631,999 filed on Feb. 1, 2022, which is a U.S. National al Stage Application of International Application No. PCT/ KR2020/010593, filed on Aug. 11, 2020, which claims the benefit under 35 USC 119(a) and 365(b) of Korean Patent Application No. 10-2019-0098337, filed on Aug. 12, 2019, Korean Patent Application No. 10-2019-0124931, filed on Oct. 8, 2019, Korean Patent Application No. 10-2020-0004469, filed on Jan. 13, 2020, and Korean Patent Application No. 10-2020-0039405, filed on Mar. 31, 2020, in the Korean Intellectual Property Office, the entire disclosure of which is incorporated herein by reference for all purposes.

TECHNICAL FIELD

The present disclosure relates to an image encoding/ decoding method and apparatus.

BACKGROUND ART

A video image is compression-encoded by removing spatial and temporal redundancy and inter-view redundancy, which may be transmitted through a communication line or stored in a form suitable for a storage medium.

DISCLOSURE

Technical Problem

An object of the present disclosure is to improve the coding efficiency of a video signal.

Technical Solution

In order to solve the above problems, the present disclosure provides a method and apparatus for dividing a high-level image and encoding/decoding division information.

The present disclosure provides a division method based on a higher-level syntax (high-level syntax) of compression encoding/decoding.

The present disclosure provides a more flexible structure by providing equal or unequal sub-picture/tile/brick/slice division when performing division based on high-level syntax.

The present disclosure proposes a method of signaling with fewer bits in height and width by configuring sub-pictures in units of tile, brick, or CTB size to perform encoding/decoding in configuring sub-picture division.

The present disclosure provides a method for reducing bit loss when only one of a height and a width of a tile is equally divided in encoding/decoding of tile division.

The present disclosure proposes a method for reducing bits without dependency on parsing by using information signaled at the same level in encoding/decoding of brick division.

The present disclosure proposes a method for reducing signaling overhead by transmitting tile/brick division as a size difference and a sign instead of size information.

In the present disclosure, in encoding/decoding tile/brick/ slice division, a method of reducing encoding/decoding bits by inducing some of information indicating division configuration without signaling it.

Advantageous Effects

The video signal processing method and apparatus according to the present disclosure may improve video signal coding efficiency through high-level image division and efficient encoding/decoding of division information.

By configuring sub-picture division in units of tile or brick size, a size of a height and a width may be signaled with fewer bits, and it may be easy to align a boundary with a sub-image.

The present disclosure provides a more flexible structure by providing equal or unequal sub-picture/tile/brick/slice division, etc., in configuring high-level division.

It is checked whether a height and a width of each of divided components of a tile are equal, and only one size value is signaled for the same size. In the case of being equally divided into only one size, it is possible to signal with fewer bits than in the related art.

Bits may be reduced without transmission dependence by using information signaled at the same level in encoding/ decoding brick division.

Signaling overhead may be reduced by encoding/decoding information on tile or brick division into smaller values than before.

Bit signaling may be reduced by inducing some information during encoding/decoding of tile/brick/slice division information without signaling it.

DESCRIPTION OF DRAWINGS

FIG. 1 illustrates a method of encoding image division information in an image encoder related to the present disclosure.

FIG. 2 illustrates a high-level image division method in an image decoder related to the present disclosure.

FIGS. 3 and 4 illustrate an example of equal division of a sub-picture.

FIG. 5 illustrates an example of unequal division of a sub-picture.

FIG. 8 is a block diagram illustrating a configuration of a video encoding apparatus according to an embodiment of the present disclosure.

FIG. 9 is a block diagram illustrating a configuration of a video decoding apparatus according to an embodiment of the present disclosure.

BEST MODE

Figures 4A, 4B:
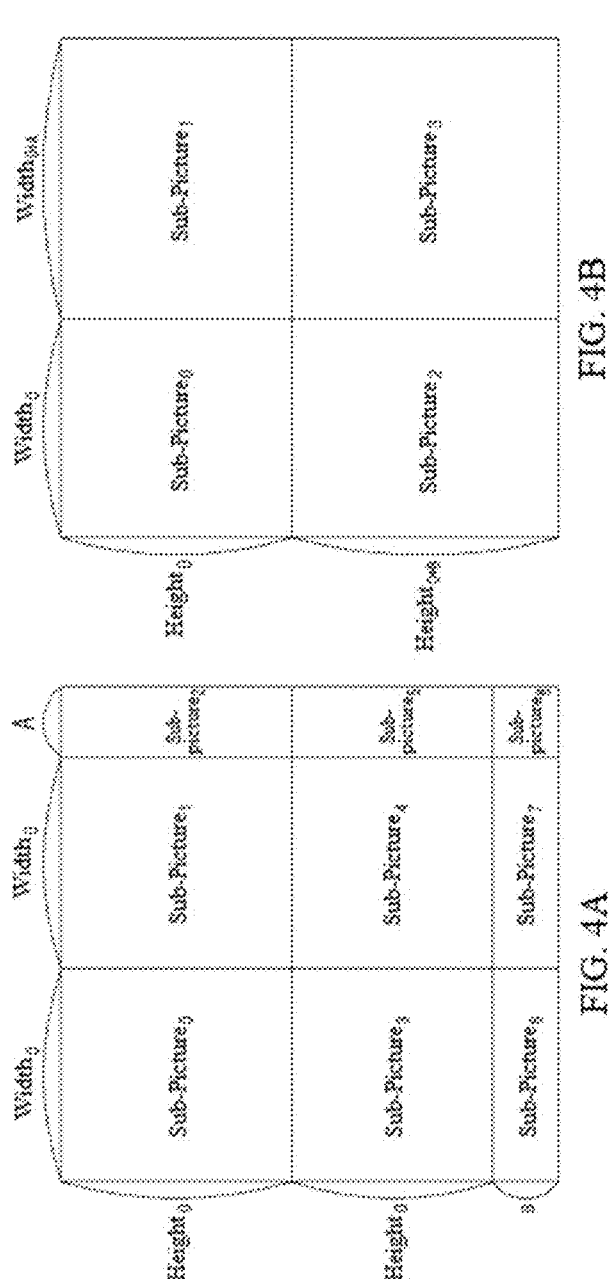

The video decoding method and apparatus according to the present disclosure may decode division information for a current picture from a bitstream, and divide the current picture into at least one unit of a sub-picture, a slice, or a tile by using the decoded division information.

In the video decoding method and apparatus according to the present disclosure, the division information may comprise at least one of sub-picture division information, slice division information, or tile division information.

In the video decoding method and apparatus according to the present disclosure, the decoding of the sub-picture division information may comprise obtaining a first flag indicating whether the current picture consists of only one sub-picture and obtaining, based on the first flag, at least one of information indicating a number of sub-pictures constituting the current picture or a second flag indicating whether the sub-pictures are equally divided.

In the video decoding method and apparatus according to the present disclosure, the decoding of the sub-picture division information may further comprise obtaining information indicating a size of each sub-picture constituting the current picture based on at least one of information indicating a number of the sub-pictures or a second flag indicating whether the sub-pictures are equally divided, In the video decoding method and apparatus according to the present disclosure, information indicating a size of the sub-pictures may be encoded in units of a size of a coding tree block (CTB) that is pre-defined in a decoding apparatus.

In the video decoding method and apparatus according to the present disclosure, the sub-picture division information may be obtained from a sequence parameter set (SPS).

In the video decoding method and apparatus according to the present disclosure, the decoding of the tile division information may comprise obtaining a third flag indicating whether division is performed on the current picture, obtaining, based on the third flag, information on a number of tile row widths constituting the current picture and on a number of tile column heights constituting the current picture, and obtaining information indicating a width and a height of each tile based on the obtained information.

In the video decoding method and apparatus according to the present disclosure, when a value of the third flag is 1, no division is performed on the current picture, and when the value of the third flag is 0, the current picture may be divided into a plurality of tiles or slices.

In the video decoding method and apparatus according to the present disclosure, the tile division information may be obtained from a picture parameter set (PPS).

In the video decoding method and apparatus according to the present disclosure, the decoding of the slice division information may comprise obtaining a fourth flag indicating whether a slice is divided in a rectangular mode or a raster scan mode, obtaining, based on the fourth flag, information indicating a number of slices belonging to the current picture, and obtaining, based on the information indicating the number of the slices, information indicating a width and a height of each slice.

In the video decoding method and apparatus according to the present disclosure, the decoding of the slice division information may further comprise obtaining information indicating a difference between an index of a tile including a top-left CTB in a next slice and an index of a tile including a top-left CTB in a current slice.

In the video decoding method and apparatus according to the present disclosure, a position of the slice may be specified based on the information indicating the difference.

In the video decoding method and apparatus according to the present disclosure, the information indicating the difference may be decoded only for some slices among a plurality of slices constituting the current picture.

In the video decoding method and apparatus according to the present disclosure, the information indicating the difference may be decoded based on a fourth flag indicating whether the information indicating the difference exists, and the fourth flag may be decoded only when a number of slices constituting the current picture is greater than or equal to a predetermined threshold number.

In the video decoding method and apparatus according to the present disclosure, the decoding of the slice division information may further comprise obtaining information indicating a number of slices belonging to one tile, and the information indicating the number of slices belonging to the one tile may be adaptively decoded based on at least one of information indicating a width and a height of the slice or information on the height of the tile.

In the video decoding method and apparatus according to the present disclosure, the current picture may be divided into at least one unit of a sub-picture, a slice, or a tile, and division information for division of the current picture may be encoded. Herein, the division information may comprise at least one of sub-picture division information, slice division information, or tile division information.

The computer-readable recording medium according to the present disclosure may store a bitstream encoded by an image encoding method, the method comprising dividing a current picture into at least one unit of a sub-picture, a slice, or a tile, and encoding division information for division of the current picture. Herein, the division information may comprise at least one of sub-picture division information, slice division information, or tile division information.

MODE FOR INVENTION

An embodiment of the present disclosure will be described in detail with reference to the accompanying drawings in the present specification so that those of ordinary skill in the art can easily implement the present disclosure. However, the present disclosure may be implemented in various different forms, and is not limited to the embodiments described herein. In the drawings, parts irrelevant to the description are omitted in order to clearly describe the present disclosure, and similar reference numerals are assigned to similar parts throughout the specification.

Throughout the specification, when a certain part is said to be 'connected' with another part, this includes not only the case where it is directly connected with another element in the middle, but also the case where it is electrically connected with another element in the middle.

In addition, throughout the specification, when a certain part 'includes' a certain component, it means that other components may be further included rather than excluding other components unless otherwise stated.

In addition, terms such as 'first' and 'second' may be used to describe various components, but components should not be limited by the terms. These terms are used only for the purpose of distinguishing one component from another component.

In addition, in the embodiments of the apparatus and method described herein, a part of configurations of the apparatus or a part of steps of the method may be omitted. In addition, an order of a part of configurations of the apparatus or a part of steps of the method may be changed. In addition, other configurations or other steps may be inserted into a part of configurations of the apparatus or a part of steps of the method.

In addition, some configurations or some steps of a first embodiment of the present disclosure may be added to a second embodiment of the present disclosure, or may replace some configurations or some steps of the second embodiment.

In addition, constituent units shown in the embodiment of the present disclosure are shown independently to represent different characteristic functions, and does not mean that each constituent unit is formed of separate hardware or a single software constituent unit. In other words, constituent units are described by being listed as a respective constituent unit for convenience of description, and at least two constituent units of constituent units are combined to form one constituent unit, or one constituent unit may be divided into a plurality of constituent units to perform a function. Integrated embodiments and separate embodiments of constituent units are also included in the scope of the present disclosure unless departing from an essence of the present disclosure.

First, a brief description of terms used in the present application are as follows.

Hereinafter, a video decoding apparatus that will be described later may be an apparatus included in a private security camera, a private security system, a military security camera, a military security system, a personal computer (PC), a notebook computer, a portable multimedia player (PMP), a wireless communication terminal, a smart phone, a server terminal such as a TV application server, a service server, and the like. In addition, a video decoding apparatus may mean An apparatus including a user terminal such as various devices, a communication device such as a communication modem for communication through wired/wireless communication networks, a memory for storing data and various programs for inter or intra prediction in order to encode or decode a video, a microprocessor for performing operation and control by executing programs, or the like.

In addition, a video encoded in a bitstream by a encoding apparatus may be transmitted in real time or non-real time to a video decoding apparatus through a wired/wireless communication network such as internet, a near-field communication network, a wireless local area network (LAN), a WiBro network, and a mobile communication network, or various communication interfaces such as a cable, and a universal serial bus (USB), and may be decoded, reconstructed as an image, and reproduced. Alternatively, a bitstream generated by an encoder may be stored in a memory. The memory may include both volatile memory and non-volatile memory. In this specification, a memory may be expressed as a recording medium storing a bitstream.

Generally, a video may be composed of a series of pictures, and each of the pictures may be divided into coding units such as blocks. In addition, it will be understood by those of ordinary skill in the technical field to which the present embodiment belongs that the term 'picture' described below may be substituted with other terms having the equivalent meaning such as an image and a frame. In addition, it will be understood by those of ordinary skill in the art that the term 'coding unit' may be substituted with other terms having the equivalent meaning such as a unit block and a block.

Hereinafter, exemplary embodiments of the present disclosure will be described in more detail with reference to the accompanying drawings. In describing the present disclosure, duplicate descriptions of the same components will be omitted.

The present disclosure relates to a high-level image division method for encoding/decoding an image and encoding/decoding of information for the image division.

In image division according to the present disclosure, one picture may be hierarchically divided such as a sub-picture, a tile, a brick, and a slice. Image division may be performed according to a method specified for each layer, and the division information may be encoded and decoded according to a specified rule.

For example, a sub-picture may be configured to coincide with a boundary of a tile or brick. A boundary of a tile may be configured as an integer multiple of a coding unit (e.g., a coding tree block (CTB)), and a height of a sub-picture may be configured as an integer multiple of a unit of a specific number of pixels (e.g., 2 pixels). Herein, when a unit of a sub-picture is smaller than a unit of a tile, bit overhead for transmitting a height and a width of a sub-picture may be increased.

In the case of a tile, a 1-bit flag indicating whether one picture is divided into tiles having equal sizes (height and width) may be encoded/decoded. Since the flag simultaneously indicates whether to divide equally in a vertical direction and whether to divide equally in a horizontal direction, in order to inform whether to divide equally for one of the two directions, division information for the other direction may be transmitted, which is unnecessary. However, the flag may be not limited to a tile, and it goes without saying that a flag having the same concept may be encoded/decoded for a sub-picture, a brick, or a slice. A tile may consist of one slice (or brick) or may be divided into a plurality of slices (or bricks). When a height of a specific tile is the same as the minimum unit of division information transmission, the corresponding tile may not always be divided into bricks. In this case, a flag indicating whether to divide may not be encoded/decoded. In a syntax used to check the above condition, a parsing dependency using information transmitted at a higher level may arise. In encoding/decoding information of a tile or a brick, size information of a width and a height is transmitted according to a coding unit. When tiles or bricks are similarly divided, transmitting all of the corresponding information may cause unnecessary bit overhead.

A slice may be made of a combination of divided bricks. In a slice configuration, for all slices, an index difference between a brick at a right end of a current slice and a brick at a right end of a previous slice and a sign for the difference may be signaled with 1-bit. In this case, in the case of a specific slice, an unnecessary case of signaling a sign for a specific slice may occur even though the sign is always constant.

In encoding/decoding height and width information of tile/brick division, in the case of a specific tile or brick, an unnecessary case of signaling may occur even though the width or height may be derived.

In encoding/decoding tile division information, signaling overhead for an undivided side may occur, and necessary information may be derived by using already encoded/decoded information.

In encoding/decoding slice division information, tile index information for indicating a location of a tile including a slice may be encoded/decoded. In this case, when a number of slices in a picture is less than or equal to a certain number, signaling overhead may occur because unnecessary indexes are encoded/decoded.

FIG. 1 illustrates a method of encoding image division information in an image encoder related to the present disclosure. FIG. 2 illustrates a high-level image division method in an image decoder related to the present disclosure.

High-Level Image Division Step

[D1] In performing high-level image division on a current image, dividing and/or merging into predetermined units may be used. Herein, the predetermined unit may include at least one of a sub-picture, a tile, a brick, or a slice. For example, one picture or sub-picture may be divided into a plurality of tiles, and a size/shape/position of a sub-picture may be determined through combination of a plurality of tiles. Alternatively, one tile or slice may be divided into a plurality of bricks or a size/shape/position of a tile or a slice may be determined through combination of a plurality of bricks. Alternatively, one picture may be divided into a plurality of sub-pictures and a plurality of tiles, respectively. A size, position, shape, etc. of one slice may be determined by combining a plurality of tiles, and further, one tile may be additionally divided into a plurality of slices.

At least one of the above-described predetermined units may be selectively used, and for this purpose, flag information regarding whether to allow the corresponding unit at a high-level (e.g., VPS, SPS, PPS, etc.) may be signaled. Each of the above-described predetermined units may have a size, shape, position, etc. independent of each other, and any one of the predetermined units may have a size, shape, position, etc. dependent on the other.

In addition, in an embodiment to be described later, encoding information for any one of the predetermined units may be derived based on a neighboring unit. Encoding information may include at least one of division information (information indicating whether to divide, information indicating whether to divide equally), size information, shape information, or location information. A neighboring unit may be a unit adjacent to at least one of left, top, top-left, top-right, or bottom-left of the current unit, and may be a region encoded/decoded before the current unit. To this end, a flag indicating whether encoding information of the current unit is derived based on encoding information of a neighboring unit or whether it is the same as encoding information of a neighboring unit may be used. The flag may be encoded and signaled by an encoding apparatus. The flag may be signaled at a higher level such as VPS, DPS, SPS, and PPS. When the flag is a first value, encoding information of a current unit may be set based on encoding information of a neighboring unit or identical to encoding information of a neighboring unit. In this case, location information of a neighboring unit merged with a current unit may be signaled, or a neighboring unit of a pre-promised position in the encoding/decoding apparatus may be used.

[D1-1] In performing high-level image division on a current image, sub-picture division may be performed. Herein, an higher image may be divided into N sub-pictures. In this case, N may be a positive integer having a value of 1 or more. Herein, an higher image may be at least one of a sequence or a picture. A sequence may mean a plurality of pictures. A sub-picture may be a unit for displaying an image, a unit for transmitting an image, or a unit for independently/parallel processing of one image.

In performing sub-picture division, a sub-picture may be a result of equal division. Herein, equal division may mean that the sizes (at least one of a width or a height) of N sub-pictures divided from the higher image are equal to each other. FIGS. 3 and 4 illustrate an example of equal division of a sub-picture.

However, even in the case of equal division, a sub-picture adjacent to one or more of the top, bottom, left, and right boundaries of a higher region may have a size different from that of other sub-pictures. For example, in FIG. 3A, sub-picture 0 and sub-picture 2 may have the same width but different heights. Alternatively, sub-picture 0 may have the same height as sub-picture 1, but may have a different width. In FIG. 3B, a ratio of a width between sub-picture 0 and sub-picture 1 may be the same as ratio of a width between sub-picture 2 and sub-picture 3. Herein, sub-picture 0 and sub-picture 1 may have different widths. In FIG. 3C, a ratio of a height between sub-picture 0 and sub-picture 1 may be the same as a ratio of a height between sub-picture 2 and sub-picture 3. Herein, sub-picture 0 and sub-picture 1 may have different heights.

Meanwhile, as shown in FIG. 4A, a scrap region generated at one or more boundaries among top, bottom, left, and right in the image division process may be one sub-picture. As shown in FIG. 4B, in the image division process, a sub-picture may be configured to include a scrap region existing at one or more boundaries among top, bottom, left, and right. Herein, equal division may be performed in a vertical direction and a horizontal direction of a higher region. Alternatively, equal division may be performed only in a vertical direction or a horizontal direction of a higher region.

In performing sub-picture division, a sub-picture may be a result of unequal division Herein, the unequal division may mean that sizes (at least one of a width or a height) of N sub-pictures divided from a higher image are different from each other. FIG. 5 illustrates an example of unequal division of a sub-picture. Herein, unequal division may be performed in a vertical directions and a horizontal direction of a higher region. Alternatively, unequal division may be performed only in a vertical direction or a horizontal direction of a higher region.

FIG. 6 illustrates a method of configuring a sub-picture using equally divided blocks.

Figures 6A, 6B, 6C:
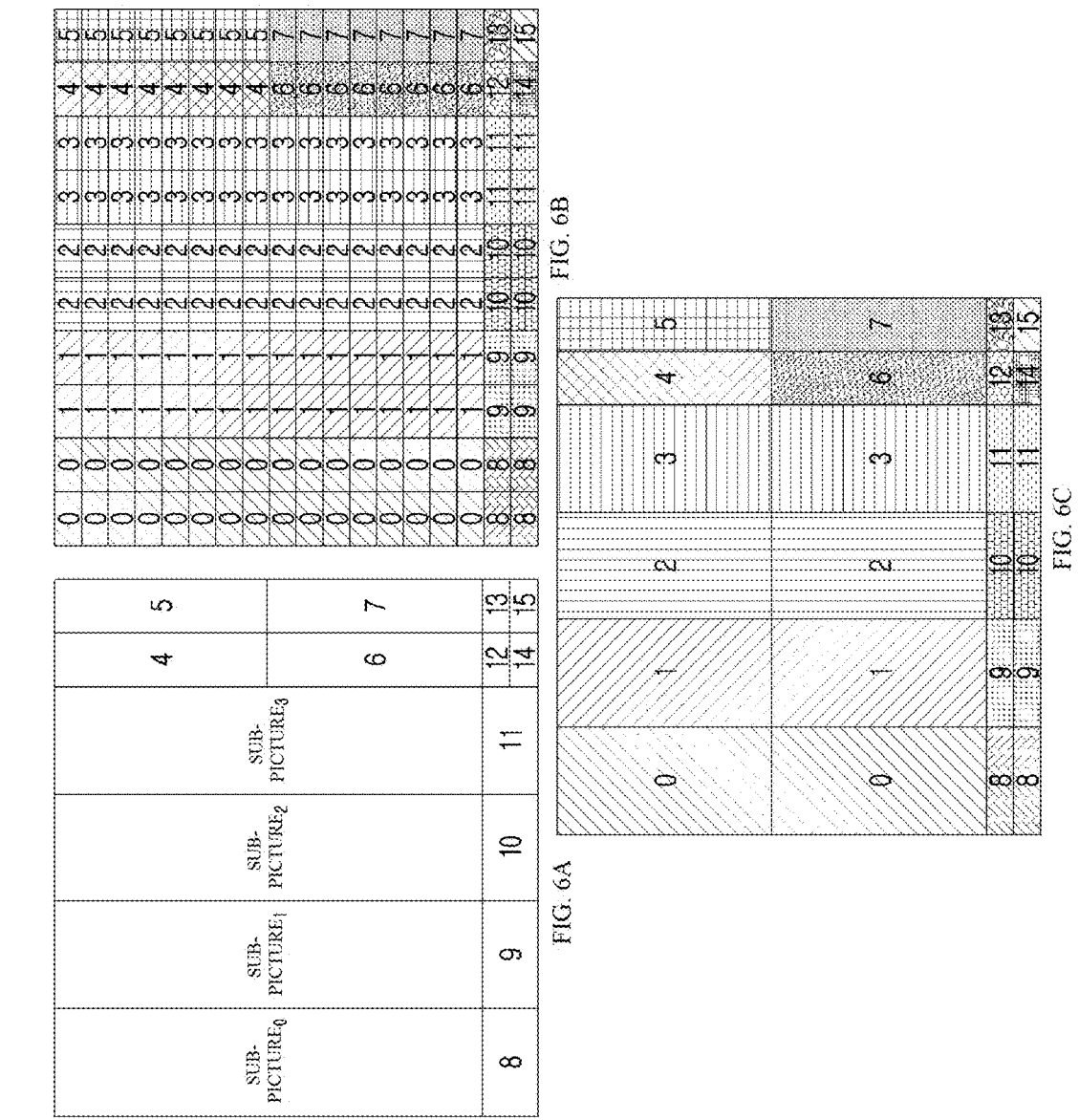
FIG. 6 illustrates a method of configuring a sub-picture using equally divided blocks.

In performing sub-picture division, a sub-picture may be configured using blocks equally divided from a higher image. In this case, an equally divided block may be configured in the same way as the equal division of the sub-picture. As an example, in order to perform sub-picture division as shown in FIG. 6A, a block equally divided as shown in FIG. 6B may be used.

For example, a region including a plurality of equally divided blocks may be configured as one sub-picture. Herein, each equally divided block may have index information, and an higher image may be divided into a group of blocks having the same index information. In this case, a block having the same index information may be in contact with another block having the same index information on at least one side thereof.

In performing sub-picture division, a sub-picture may be configured using a block unequally divided from a higher image. In this case, an unequally divided block may be configured in the same way as the unequal division of the sub-picture. As an example, in order to perform sub-picture division as shown in FIG. 6A, an unequally divided block as shown in FIG. 6C may be used. For example, a region including a plurality of unequally divided blocks may be configured as one sub-picture. Herein, each unequally divided block may have index information, and an higher image may be divided into a group of blocks having the same index information. In this case, a block having the same index information may be in contact with another block having the same index information on at least one side thereof. Equal division of a sub-picture may be performed in a vertical direction of a higher region, and unequal division of a sub-picture may be performed in a horizontal direction. Alternatively, unequal division of a sub-picture may be performed in a vertical direction of a higher region, and equal division of a sub-picture may be performed in a horizontal direction. A unit of a width and a height of a sub-picture may be one of 2 to the power of n and n multiples of a size (width, height) of a coding tree block (CTB), respectively. In this case, n may be an integer having a value of 0 or more. In this case, at least one of a width or a height of a CTB may be 2 to the power of n. For example, at least one of a width or a height of a CTB may be 128. For example, at least one of a width or a height of a CTB may be 64. For example, at least one of a width or a height of a CTB may be 32. For example, at least one of a width or a height of a CTB may be 16. For example, at least one of a width or a height of a CTB may be 8. For example, at least one of a width or a height of a sub-picture may be a multiple of at least one or more of a width or a height of a CTB. For example, when at least one of a width or a height of a CTB is 128, at least one of a width or a height of a sub-picture may be a multiple of 128. For example, when at least one of a width or a height of a CTB is 64, at least one of a width or a height of a sub-picture may be a multiple of 64. For example, when at least one of a width or a height of a CTB is 32, at least one of a width or a height of a sub-picture may be a multiple of 32. For example, when at least one of a width or a height of a CTB is 16, at least one of a width or a height of a sub-picture may be a multiple of 16. For example, when at least one of a width or a height of a CTB is 8, at least one of a width or a height of a sub-picture may be a multiple of 8.

Alternatively, a unit of a width and a height of a sub-picture may be set to a width and a height of a coding tree block (CTB), respectively. That is, a width of a sub-picture may be set in the form of n multiples of a width of a CTB, and a height of a sub-picture may be set in the form of n multiples of a height of a CTB. In this case, n may be an integer having a value of 0 or more. Alternatively, n may be a value greater than a predetermined non-zero threshold value. A width and a height of a CTB may mean a minimum CTB size or a maximum CTB size allowed by an encoding/decoding device.

Alternatively, a unit of a width and a height of a sub-picture may be set to a fixed value pre-promised to an encoding/decoding apparatus. Herein, the fixed value may be an integer of 8, 16, 32, 64, 128, 256 or more. Alternatively, the fixed value may be set to the minimum/maximum CTB size (L), L/2, L/4, L/8, L/16, or L/32 allowed by an encoding/decoding apparatus. At least one of a width or a height of a sub-picture may be an n multiple of the fixed value.

Alternatively, a unit of a width and a height of a sub-picture may be set to a minimum/maximum CB size. Information on the minimum or maximum CB size may be signaled by an encoding device. Alternatively, a unit of a width and a height of a sub-picture may be set to a minimum/maximum prediction unit (PU) size or a minimum/maximum transform unit (TU) size. At least one of information on a minimum or maximum PU/TU size may be signaled by an encoding apparatus.

Alternatively, size information indicating units of a width and a height of a sub-picture may be signaled separately. The size information may be signaled in at least one of a high-level such as a video sequence, a picture, a slice, or a tile. For example, the same sub-picture unit may be applied to all pictures in a video sequence, or different sub-picture units may be applied to each picture. In this case, a width and a height of a sub-picture may be determined in the form of a multiple of a size according to the size information.

Alternatively, different units may be applied to each of a width and a height of a sub-picture. For example, a unit of a width of a sub-picture may be the first unit, and a unit of a height of a sub-picture may be the second unit. Herein, the first unit may be any one of the aforementioned CTB size, minimum CTB size, maximum CTB size, a fixed value, or signaled size information, and the second unit may be a different unit from the first unit. Alternatively, a unit of a width of a sub-picture may be the third unit, and a unit of a height of a sub-picture may be the fourth unit. The third unit may be larger than the fourth unit. For example, the third unit may be an m multiple of the above-described first unit, and the fourth unit may be the above-described first unit. The m may be an integer greater than or equal to 2.

The above-described embodiment for a unit of a width and a height of a sub-picture may be applied in the same/similar manner to a unit of a predetermined fragment region constituting a picture. Herein, the fragment region may mean at least one of a slice, a tile, or a brick as well as a sub-picture.

[D1-2] In performing high-level image division on a current image, tile division may be performed. Herein, a higher region may be divided into N tiles. In this case, N may be a positive integer having a value of 1 or more. Herein, a tile may be a unit in which parallel encoding/decoding of an image is performed. Herein, a higher region may be one of a sequence, a picture, a sub-picture, and a slice.

In performing tile division, a tile may be a result of equal division. Herein, the equal division may mean that sizes (at least one of a width or a height) of N tiles divided from a higher image are equal to each other. The details are the same as the equal division in [D1-1].

In performing tile division, a tile may be a result of unequal division. Herein, unequal division may mean that sizes (at least one of a width or a height) of N tiles divided from a higher image are different from each other. The details are the same as the unequal division in [D1-1].

In performing tile division, a tile may be configured using blocks equally divided from an higher image. In this case, an equally divided block may be configured in the same way as the equal division of the tile. The details are the same as the division using equally divided blocks in [D1-1].

In performing tile division, a tile may be configured using blocks unequally divided from an higher image. In this case, an unequally divided block may be configured in the same way as the unequal division of the tile. The details are the same as the division using unequally divided blocks in [D1-1].

Herein, equal division of a tile may be performed in a vertical direction of a higher region and unequal division of a tile may be performed in a horizontal direction of a higher region. Herein, unequal division of a tile may be performed in a vertical direction of a higher region and equal division of a tile may be performed in a horizontal direction of a higher region. Herein, a unit of a width and a height of a tile may be one of 2 to the power of n and n multiples of a size (width, height) of a coding tree block (CTB). In this case, n may be an integer having a value of 0 or more.

[D1-3] In performing high-level image division on the current image, brick division may be performed. Herein, a higher region may be divided into N bricks by at least one of a horizontal division method and a vertical division methos. In this case, N may be a positive integer having a value of 1 or more.

Herein, a brick may mean a sub-tile or a slice. A brick may be a unit in which parallel encoding/decoding of an image is performed. Herein, a higher region may be at least one of a sequence, a picture, a sub-picture, a slice, or a tile.

In performing brick division, a brick may be a result of equal division. Herein, the equal division may mean that sizes (at least one of a width or a height) of N bricks divided from a higher image are equal to each other. The details are the same as the equal division in [D1-1].

In performing brick division, a brick may be a result of unequal division. Herein, the unequal division may mean that sizes (at least one of a width or a height) of N bricks divided from a higher image are different from each other. The details are the same as the unequal division in [D1-1].

In performing brick division, a brick may be configured using equally divided blocks in a higher image. In this case, an equally divided block may be configured in the same way as in the above-described equal division of the brick. The details are the same as the division using equally divided blocks in [D1-1].

In performing brick division, a brick may be configured using unequally divided blocks in a higher image. In this case, an unequally divided block may be configured in the same way as in the above-described unequal division of the brick. The details are the same as the division using unequally divided blocks in [D1-1].

Herein, equal division of a brick may be performed in a vertical direction of a higher region and unequal division of a brick may be performed in a horizontal direction of a higher region. Herein, unequal division of a brick may be performed in a vertical direction of a higher region and equal division of a brick may be performed in a horizontal direction of a higher region. Herein, a unit of a width and a height of a brick may be one of 2 to the power of n and n multiples of a size (width, height) of a coding tree block (CTB). In this case, n may be an integer having a value of 0 or more.

[D1-4] In performing high-level image division on a current image, slice division may be performed. Herein, a higher region may be divided into N slices. In this case, N may be a positive integer having a value of 1 or more.

Herein, a slice may mean a picture, a sub-picture group, a sub-picture, a tile group, a tile, a brick group, or a brick, and is a unit in which image encoding information at a low-level is transmitted, or a unit in which parallel encoding/decoding is performed. Herein, a higher region may be at least one of a sequence, a picture, a sub-picture, or a tile.

In performing slice division, a slice may be a result of equal division. Herein, the equal division may mean that sizes (at least one of a width or a height) of N slices divided from a higher image are equal to each other. The details are the same as the equal division in [D1-1].

In performing slice division, a slice may be a result of unequal division. Herein, the unequal division may mean that sizes (at least one of a width or a height) of N slices divided from a higher image are different from each other. The details are the same as the unequal division in [D1-1].

In performing slice division, a slice may be configured using equally divided blocks in a higher image. In this case, an equally divided block may be configured in the same way as in the above-described equal division of the slice. The details are the same as the division using equally divided blocks in [D1-1].

In performing slice division, a slice may be configured using unequally divided blocks in a higher image. In this case, an unequally divided block may be configured in the same way as in the above-described unequal division of the slice. The details are the same as the division using unequally divided blocks in [D1-1].

Herein, equal division of a slice may be performed in a vertical direction of a higher region and unequal division of a slice may be performed in a horizontal direction of a higher region. Herein, unequal division of a slice may be performed in a vertical direction of a higher region and equal division of a slice may be performed in a horizontal direction of a higher region. Herein, a unit of a width and a height of a slice may be one of 2 to the power of n and n multiples of a size (width, height) of a coding tree block (CTB). In this case, n may be an integer having a value of 0 or more.

In performing slice division, the sub-picture division may be used. For example, slice division may be performed on each of sub-pictures divided by the [D1-1] method. For example, slice division may be performed into a region in which n sub-pictures are combined among sub-pictures divided by the [D1-1] method. In this case, n may be an integer of 1 or more.

In performing slice division, the tile division may be used. For example, slice division may be performed on each of tiles divided by the [D1-2] method. For example, slice division may be performed into a region in which n tiles are combined among tiles divided by the [D1-2] method. In this case, n may be an integer of 1 or more.

In performing slice division, the brick division may be used. For example, slice division may be performed on each of bricks divided by the [D1-3] method. For example, slice division may be performed into a region in which n bricks are combined among bricks divided by the [D1-3] method. In this case, n may be an integer of 1 or more.

High-Level Image Division Information Encoding/Decoding Step

[D2] In encoding/decoding a high-level image division information of [D1] for the current video/image, high-level image division information belonging to at least one parameter set among various high-level parameter sets may be encoded/decoded.

A high-level parameter set may be at least one of various parameter sets such as a decoding parameter set (Decoding Parameter Set; DPS), a video parameter set (Video Parameter Set; VPS), a sequence parameter set (Sequence Parameter Set; SPS), a picture parameter set (Picture Parameter Set; PPS)), an adaptation parameter set (APS), and a picture header (PH).

Tables 1 to 5 are examples of DPS, VPS, SPS, PPS, APS syntax structures.

TABLE 1

| | Descriptor |
|---|---|
| decoding_parameter_set_rbsp( ) { | |
| . . . | |
| dps_decoding_parameter_set_id | u(4) |
| . . . | |
| } | |

TABLE 2

| | Descriptor |
|---|---|
| video_parameter_set_rbsp( ) { | |
| . . . | |
| vps_video_parameter_set_id | u(4) |
| . . . | |
| } | |

TABLE 3

| | Descriptor |
|---|---|
| seq_parameter_set_rbsp( ) { | |
| . . . | |
| sps_decoding_parameter_set_id | u(4) |
| sps_video_parameter_set_id | u(4) |
| . . . | |
| } | |

TABLE 4

| | Descriptor |
|---|---|
| pic_parameter_set_rbsp( ) { | |
| . . . | |
| pps_pic_parameter_set_id | ue (v) |
| pps_seq_parameter_set_id | ue (v) |
| . . . | |
| } | |

TABLE 5

| | Descriptor |
|---|---|
| adaptation_parameter_set_rbsp( ) { | |
| ... | |
| adaptation_parameter_set_id | u(5) |
| ... | |
| } | |

Herein, the high-level image division information of [D1] may be image division information of at least one of a sub-picture, a tile, a brick, or a slice. In addition, image division may be performed by combining the above-described predetermined units, and the high-level image division information of the present disclosure may further include image combination information. Hereinafter, the image division information may be interpreted as image combination information.

[D2-1] In encoding/decoding the high-level image division information of [D1], image division information may be encoded/decoded within a specific parameter set.

For example, the high-level image division information of [D1] may be encoded/decoded in a DPS. For example, the high-level image division information of [D1] may be encoded/decoded in a VPS. For example, the high-level image division information of [D1] may be encoded/decoded in a SPS. For example, the high-level image division information of [D1] may be encoded/decoded in a PPS. For example, the high-level image division information of [D1] may be encoded/decoded in a APS.

[D2-2] In encoding/decoding the high-level image division information of [D1], image division information may be encoded/decoded within one or more parameter sets. Herein, a parameter set may be at least one of various parameter sets such as VPS, SPS, PPS, and APS.

[D2-2-1] In encoding/decoding the high-level image division information of [D1], image division information may be encoded/decoded within one or more parameter sets according to the above-described predetermined unit.

For example, division information for some (e.g., sub-picture) of the above-described predetermined units may be encoded/decoded at a higher level than the rest (e.g., tile, brick, or slice). For example, division information of a sub-picture may be encoded/decoded in a SPS, and division information of a tile/brick/slice may be encoded/decoded in a PPS, respectively.

Table 6 is an example of a syntax for encoding/decoding division information of a sub-picture in SPS.

TABLE 6

| | Descriptor |
|---|---|
| seq_parameter_set_rbsp( ) { | |
| ... | |
| sps_decoding_parameter_set_id | u(4) |

TABLE 6-continued

| | Descriptor |
|---|---|
| sps_video_parameter_set_id | u(4) |
| ... | |
| subpics_present_flag | u(1) |
| ... | |
| } | |

Herein, subpics_present_flag may indicate whether it consists of only one sub-picture. For example, when subpics_present_flag is 0, a current picture may consist of only one sub-picture, and when subpics_present_flag is 1, a current picture may consist of one or more sub-pictures. Alternatively, subpics_present_flag may indicate whether sub-picture division information is signaled at an SPS or a lower level of a SPS.

In performing sub-picture division on a current image as in [D1-1], when only equal division is performed, as shown in Table 7, sub-picture division information may be encoded/decoded in a SPS only by a width and a height of a sub-picture.

TABLE 7

| | Descriptor |
|---|---|
| seq_parameter_set_rbsp( ) { | |
| ... | |
| sps_decoding_parameter_set_id | u(4) |
| sps_video_parameter_set_id | u(4) |
| ... | |
| subpics_present_flag | u(1) |
| if( subpics_present_flag ) { | |
| max_subpics_minus1 | |
| subpic_grid_col_width_minus1 | |
| subpic_grid_row_height_minus1 | |
| for( i = 0; i < NumSubPicGridRows; i++ ) | |
| for( j = 0; j < NumSubPicGridCols; j++ ) | |
| subpic_grid_idx[ i ][ j ] | |
| for( i = 0; i <= NumSubPics; i++ ) { | |
| subpic_treated_as_pic_flag[ i ] | |
| loop_filter_across_subpic_enabled_flag[ i ] | |
| } | |
| } | |
| ... | |
| } | |

Herein, max_subpics_minus1 may indicate the number of sub-pictures configuring one picture. max_subpics_minus1 may be encoded/decoded based on subpics_present_flag indicating presence or absence of sub-picture division information. subpic_grid_col_width_minus1 may mean a width f a sub-picture, and subpic_grid_row_height_minus1 may mean a height of a sub-picture, respectively.

The division information may be signaled in a unit of 2 to the power of n, CTB size (width, height). In this case, n may be an integer having a value of 0 or more.

Meanwhile, information on at least one of a width and a height of a sub-picture may be omitted according to a division direction. A division direction may be pre-defined in the encoding/decoding device, and the division direction information may be signaled separately. Alternatively, only information on the number of sub-pictures belonging to one picture may be signaled, and information on the size of a sub-picture may not be signaled. In this case, a sub-picture adjacent to a right boundary of a picture may have a larger width than a sub-picture adjacent to a left boundary of a picture. Likewise, a sub-picture adjacent to a bottom boundary of a picture may have a larger height than a sub-picture adjacent to a top boundary of a picture.

For example, in performing sub-picture division on a current image as in [D1-1], when at least one of equal division and unequal division is performed, sub-picture division information may be encoded/decoded in a SPS as shown in Table 8.

TABLE 8

|  | Descriptor |
| --- | --- |
| seq_parameter_set_rbsp( ) { | |
| ... | |
| sps_decoding_parameter_set_id | u(4) |
| sps_video_parameter_set_id | u(4) |
| ... | |
| subpics_present_flag | u(1) |
| if( subpics_present_flag ) { | |
| ... | |
| uniform_subpic_grid_spacing_flag | |
| ... | |
| if(uniform_subpic_grid_spacing_flag) { | |
| ... | |
| subpic_cols_width_minus1 | |
| subpic_rows_height_minus1 | |
| ... | |
| } else { | |
| ... | |
| num_subpic_columns_minus1 | |
| num_subpic_columns_minus1 | |
| ... | |
| for( i = 0; i < num_subpic_columns_minus1; i++ ) | |
| subpic_column_width_minus1[ i ] | |
| for( i = 0; i < num_subpic_rows_minus1; i++ ) | |
| subpic_row_height_minus1[ i ] | |
| ... | |
| } | |
| ... | |
| } | |

Herein, uniform_subpic_grid_spacing_flag may be a flag indicating whether a sub-picture is equally divided or unequally divided. That is, uniform_subpic_grid_spacing_flag may indicate whether all sub-pictures belonging to one picture have the same size specified by subpic_cols_width_minus1 and subpic_rows_height_minus1. subpic_cols_width_minus1 may indicate a width of a sub-picture, and subpic_rows_height_minus1 may indicate a height of a sub-picture.

The width/height information may be signaled in a unit of 2 to the power of n, CTB size (width, height). In this case, n may be an integer having a value of 0 or more. The width/height information may be encoded/decoded only for the first sub-picture of the current picture, and the remaining sub-pictures may share the acquired width/height information for the first sub-picture.

In this case, at least one of a width or a height of a CTB may be 2 to the power of n. For example, at least one of a width or a height of a CTB may be 128. For example, at least one of a width or a height of a CTB may be 64. For example, at least one of a width or a height of a CTB may be 32. For example, at least one of a width or a height of a CTB may be 16. For example, at least one of a width or a height of a CTB may be 8.

For example, at least one of a width or a height of a sub-picture may be a multiple of at least one or more of a width or a height of a CTB. For example, when at least one of a width or a height of a CTB is 128, at least one of a width or a height of a sub-picture may be a multiple of 128. For example, when at least one of a width or a height of a CTB is 64, at least one of a width or a height of a sub-picture may be a multiple of 64. For example, when at least one of a width or a height of a CTB is 32, at least one of a width or a height of a sub-picture may be a multiple of 32. For example, when at least one of a width or a height of a CTB is 16, at least one of a width or a height of a sub-picture may be a multiple of 16. For example, when at least one of a width or a height of a CTB is 8, at least one of a width or a height of a sub-picture may be a multiple of 8.

num_subpic_columns_minus1 may mean the number of sub-pictures included in a current image width, and num_subpic_rows_minus1 may mean the number of sub-pictures included in a current image height. Information on the number of sub-pictures may be respectively defined in a vertical/horizontal direction as shown in Table 8 and encoded using two syntaxes, or may be encoded using one syntax indicating the total number of sub-pictures as shown in Table 7.

On the other hand, when a width and a height of a current image are provided in a SPS, subpic_cols_width_minus1 and subpic_cols_height_minus1 may not be encoded/decoded in the case of a sub-picture having the last index as shown in Table 9.

TABLE 9

|  | Descriptor |
| --- | --- |
| seq_parameter_set_rbsp( ) { | |
| ... | |
| sps_decoding_parameter_set_id | u(4) |
| sps_video_parameter_set_id | u(4) |
| ... | |
| subpics_present_flag | u(1) |
| if( subpics_present_flag ) { | |
| ... | |
| } else { | |
| ... | |
| for( i = 0; i < num_subpic_columns_minus1 − 1; i++ ) | |
| subpic_column_width_minus1[ i ] | |
| for( i = 0; i < num_subpic_rows_minus1 − 1; i++ ) | |
| subpic_row_height_minus1[ i ] | |
| ... | |
| } | |
| ... | |
| } | |

Table 10 is an example of a partial syntax for encoding/decoding tile/brick/slice division information in PPS.

TABLE 10

|  | Descriptor |
| --- | --- |
| pic_parameter_set_rbsp( ) { | |
| ... | |
| pps_pic_parameter_set_id | ue(v) |
| pps_seq_parameter_set_id | ue(v) |
| ... | |
| single_tile_in_pic_flag | u(1) |
| if( !single_tile_in_pic_flag ) { | |
| ... | |
| brick_splitting_present_flag | u(1) |
| ... | |
| single_brick_per_slice_flag | u(1) |
| if( !single_brick_per_slice_flag ) | |
| rect_slice_flag | u(1) |
| } | |
| ... | |
| } | |

Herein, single_tile_in_pic_flag may be a flag indicating whether a tile is a single picture. Herein, brick_splitting_present_flag may be a flag indicating whether at least one of a plurality of tiles belonging to one picture is divided into a plurality of bricks. Alternatively, brick_splitting_present_flag may indicate whether one tile is divided into a plurality of bricks or indicate whether brick division information is signaled. Herein, single_brick_per_slice_flag may be a flag indicating whether one brick is one slice. Herein, rect_slice_flag may be a flag indicating whether a slice has a rectangular shape or a raster scan shape. On the other hand, when uniform_tile_spacing_flag is 1, the number of tiles in a picture cannot be derived, but can be informed by signaling. When uniform_tile_spacing_flag is 1, information indicating a size (at least one of a width or a height) of a tile constituting a picture may be signaled. When uniform_tile_spacing_flag is 0, information indicating a number of tiles constituting one picture may be signaled, and information indicating a size (at least one of a width or a height) of each tile according to the number of tiles may be signaled.

However, the present disclosure is not limited thereto, and at least one of information indicating the number of tiles or information indicating the size of each tile according to the number of tiles may be signaled regardless of uniform_tile_spacing_flag. In this case, information indicating the number of tiles may comprise information on the number of tile column widths constituting a picture and information on the number of tile row heights constituting a picture, which may be signaled, respectively. However, information indicating the number of tiles and information indicating the size of tiles may be signaled only when one picture is divided into predetermined units (e.g., slices, tiles).

For example, when performing only equal division in performing tile division on a current image as in [D1-2], as shown in Table 11, it is possible to encode/decode tile division information in the PPS only with a width and a height of a tile.

TABLE 11

|  | Descriptor |
| --- | --- |
| pic_parameter_set_rbsp( ) { |  |
| pps_pic_parameter_set_id | ue(v) |
| pps_seq_parameter_set_id | ue(v) |
| ... |  |
| single_tile_in_pic_flag | u(1) |
| if ( !single_tile_in_pic_flag ) { |  |
| ... |  |
| tile_cols_width_minus1 | ue(v) |
| tile_rows_height_minus1 | ue(v) |
| ... |  |
| } |  |
| ... |  |
| } |  |

Herein, tile_cols_width_minus1 may mean a width of a tile, and tile_rows_width_minus1 may mean a height of a tile. For example, when performing tile division on the current image as in [D1-2], at least one of equal division and unequal division is performed, as shown in Table 12, it is possible to encode/decode tile division information in a PPS.

TABLE 12

|  | Descriptor |
| --- | --- |
| pic_parameter_set_rbsp( ) { |  |
| pps_pic_parameter_set_id | ue(v) |
| pps_seq_parameter_set_id | ue(v) |
| ... |  |
| single_tile_in_pic_flag | u(1) |
| if( !single_tile_in_pic_flag ) { |  |
| ... |  |
| uniform_tile_spacing_flag | u(1) |
| ... |  |

TABLE 12-continued

|  | Descriptor |
| --- | --- |
| if(uniform_tile_spacing_flag) { |  |
| ... |  |
| tile_cols_width_minus1 | ue(v) |
| tile_rows_height_minus1 | ue(v) |
| ... |  |
| } else { |  |
| ... |  |
| num_tile_columns_minus1 | ue(v) |
| num_tile_rows_minus1 | ue(v) |
| ... |  |
| for( i = 0; i < num_tile_columns_minus1; i++ ) |  |
| tile_column_width_minus1[ i ] | ue(v) |
| for( i = 0; i < num_tile_rows_minus1; i++ ) |  |
| tile_row_height_minus1[ i ] | ue(v) |
| ... |  |
| } |  |
| ... |  |
| } |  |

Herein, uniform_tile_spacing_flag may be a flag indicating whether a tile is equally divided or unequally divided. When tiles are equally divided, tile_col_width_minus1 and tile_row_height_minus1 may be signaled. tile_col_width_minus1 may mean a width of a tile, and tile_row_height_minus1 may mean a height of a tile. On the other hand, when tiles are unequally divided, information indicating the number of tiles may be signaled, and information indicating the size of each tile according to the number of tiles (tile_column_width_minus1[i], tile_row_height_minus1[i]) may be signaled. However, the present disclosure is not limited thereto, and it may be set to use either one of equal division or unequal division in the encoder/decoder. In this case, regardless of uniform_tile_spacing_flag, at least one of information indicating the number of tiles or information indicating the size of each tile according to the number of tiles may be signaled.

The width/height information may be signaled in a unit of 2 to the power of n, CTB size (width, height). In this case, n may be an integer having a value of 0 or more. For example, tile_col_width_minus1 may be transmitted in a CTB unit with a width of 128. For example, tile_col_width_minus1 may be transmitted in a CTB unit with a width of 64. For example, tile_col_width_minus1 may be transmitted in a CTB unit with a width of 32. For example, tile_col_width_minus1 may be transmitted in a CTB unit with a width of 16. For example, tile_col_width_minus1 may be transmitted in a CTB unit with a width of 8. For example, tile_col_width_minus1 may be transmitted in a CTB unit with a width of 4. For example, tile_row_height_minus1 may be transmitted in a CTB unit with a width of 128. For example, tile_row_height_minus1 may be transmitted in a CTB unit with a width of 64. For example, tile_row_height_minus1 may be transmitted in a CTB unit with a width of 32. For example, tile_row_height_minus1 may be transmitted in a CTB unit with a width of 16. For example, tile_row_height_minus1 may be transmitted in a CTB unit with a width of 8.

Herein, tile_col_width_minus1 may be replaced with tile_col_width_delta. The tile_col_width_delta may mean a difference between a width of a current tile and a width of a previous tile. Herein, a previous tile may mean a tile belonging to a left column or a top row with respect to a current tile. A previous tile may mean a tile having a coding order (or scan order) prior to a current tile. Alternatively, a previous tile may be any one of tiles belonging to the leftmost column or the topmost row of a picture, or may be a tile located at a top-left of a picture.

The difference may be positive, negative or zero. When the difference is 0, information on a sign may not be transmitted. When the difference is positive or negative, the corresponding information may be informed using one flag, and may be named as sign_tile_col_width_delta.

Herein, tile_row_height_minus1 may be replaced with tile_row_height_delta. The tile_row_height_delta may mean a difference between a height of a current tile and a width (or height) of a previous tile. Herein, a previous tile may mean a tile belonging to a left column or a top row with respect to the current tile. A previous tile may mean a tile having a coding order (or scan order) prior to a current tile. Alternatively, the previous tile may be any one of tiles belonging to the leftmost column or the topmost row of a picture, or may be a tile located at the top-left of a picture.

The difference may be positive, negative or zero. When the difference is 0, information on a sign may not be transmitted. When the difference is positive or negative, the corresponding information may be informed using one flag, and may be named as sign_tile_row_hegith_delta.

Herein, num_tile_columns_minus1 may mean the number of tiles included in the current image width, that is, the number of tile row widths constituting the current image, num_tile_rows_minus1 may mean the number of tiles included in the current image height, that is, the number of tile column heights constituting the current image.

Herein, uniform_tile_spacing_flag may be signaled by dividing it into uniform_tile_row_spacing_flag and uniform_tile_col_spacing_flag. uniform_tile_row_spacing_flag and uniform_tile_col_spacing_flag are flags indicating whether a tile is divided equally or unequally for each of a width and a height of the tile, and may be encoded/decoded as shown in Table 13.

TABLE 13

|  | Descriptor |
|---|---|
| pic_parameter_set_rbsp( ) { |  |
| pps_pic_parameter_set_id | ue(v) |
| pps_seq_parameter_set_id | ue(v) |
| ... |  |
| single_tile_in_pic_flag | u(1) |
| if( !single_tile_in_pic_flag ) { |  |
| ... |  |
| uniform_tile_row_spacing_flag | u(1) |
| uniform_tile_col_spacing_flag | u(1) |
| ... |  |
| if(uniform_tile_row_spacing_flag) { |  |
| ... |  |
|   tile_rows_height_minus1 | ue(v) |
| ... |  |
| } else { |  |
| ... |  |
| num_tile_rows_minus1 | ue(v) |
| ... |  |
| for( i = 0; i < num_tile_rows_minus1; i++ ) |  |
| tile_row_height_minus1[ i ] | ue(v) |
| ... |  |
| } |  |
| ... |  |
| if(uniform_tile_col_spacing_flag) { |  |
| ... |  |
|   tile_cols_width_minus1 | ue(v) |
| ... |  |
| } else { |  |
| ... |  |
| num_tile_cols_minus1 | ue(v) |
| ... |  |
| for( i = 0; i < num_tile_cols_minus1; i++ ) |  |
| tile_col_width_minus1[ i ] | ue(v) |
| ... |  |
| } |  |

When a width and a height of a current image are provided in a SPS, tile_cols_width_minus1 and tile_rows_height_minus1 may not be encoded/decoded for the tile of the last index as shown in Table 14.

TABLE 14

|  | Descriptor |
|---|---|
| pic_parameter_set_rbsp( ) { |  |
| pps_pic_parameter_set_id | ue(v) |
| pps_seq_parameter_set_id | ue(v) |
| ... |  |
| single_tile_in_pic_flag | u(1) |
| if( !single_tile_in_pic_flag ) { |  |
| ... |  |
| uniform_tile_spacing_flag | u(1) |
| ... |  |
| if(uniform_tile_spacing_flag) { |  |
| ... |  |
| tile_cols_width_minus1 | ue(v) |
| tile_rows_height_minus1 | ue(v) |
| ... |  |
| } else { |  |
| ... |  |
| num_tile_columns_minus1 | ue(v) |
| num_tile_rows_minus1 | ue(v) |
| ... |  |
| for( i = 0; i < num_tile_columns_minus1−1; i++ ) |  |
| tile_column_width_minus1[ i ] | ue(v) |
| for( i = 0; i < num_tile_rows_minus1−1; i++ ) |  |
| tile_row_height_minus1[ i ] | ue(v) |
| ... |  |
| } |  |
| ... |  |
| } |  |

In performing tile division on a current image as in [D1-2], as shown in Table 15, tile division information may be encoded/decoded in a PPS.

TABLE 15

|  | Descriptor |
|---|---|
| pic_parameter_set_rbsp( ) { |  |
| pps_pic_parameter_set_id | ue(v) |
| pps_seq_parameter_set_id | ue(v) |
| ... |  |
| no_pic_partition_flag | u(1) |
| if( !no_pic_partition_flag ) { |  |
| num_exp_tile_columns_minus1 | ue(v) |
| num_exp_tile_rows_minus1 | ue(v) |
| for( i = 0; i <= num_exp_tile_columns_minus1; i++ ) |  |
| tile_column_width_minus1[ i ] | ue(v) |
| for( i = 0; i <= num_exp_tile_rows_minus1; i++ ) |  |
| tile_row_height_minus1[ i ] | ue(v) |

Herein, no_pic_partition_flag may indicate whether a picture division is performed. For example, when no_pic_partition_flag is 1, picture division is not performed, and when no_pic_partition_flag is 0, one picture may be divided into a plurality of tiles or slices. It may mean whether a picture is divided into tiles or slices. Herein, num_exp_tile_columns_minus1 may indicate the number of tile column widths to be explicitly transmitted. num_exp_tile_columns_minus1 may indicate the number of tile columns constituting one picture. The number of tile columns constituting one picture may be derived by adding 1 to a value of num_exp_tile_columns_minus1. In this case, num_exp_tile_columns_minus1 may be expressed as num_exp_tile_columns as an example of syntax indicating the number of tile column widths to be explicitly transmitted.

num_exp_tile_columns_minus1 may indicate the number of widths of tiles until the tiles are equally divided based on a left-to-right direction. That is, when dividing a width of a current picture, num_exp_tile_columns_minus1 may specify a position at which tiles are equally divided.

For example, when a value of num_exp_tile_columns_minus1 is 0, it may mean that division for a width of a picture is performed based on equal division. When a value of num_exp_tile_columns_minus1 is 1, it may mean that tiles from the first tile to the second tile in the left-to-right direction are configured through unequal division, and the remaining tiles including the third tile are configured through equal division.

Alternatively, num_exp_tile_columns_minus1 may indicate the number of widths of tiles until the tiles are equally divided based on a right-to-left direction.

For example, when a value of num_exp_tile_columns_minus1 is 0, it may mean that division for a width of a picture is performed based on equal division. When a value of num_exp_tile_columns_minus1 is 1, it may mean that tiles from the first tile to the second tile in the right-to-left direction are configured through unequal division, and the remaining tiles including the third tile are configured through equal division.

Herein, num_exp_tile_rows_minus1 may indicate the number of tile row heights to be explicitly transmitted. num_exp_tile_rows_minus1 may indicate the number of tile rows constituting one picture. The number of tile rows constituting one picture may be derived by adding 1 to the value of num_exp_tile_rows_minus1. In this case, num_exp_tile_rows_minus1 may be expressed as num_exp_tile_rows as an example of syntax indicating the number of tile row heights to be explicitly transmitted.

num_exp_tile_rows_minus1 may indicate the number of heights of tiles until the tiles are equally divided based on a top-to-bottom direction. That is, num_exp_tile_columns_minus1 may specify a position at which tiles are equally divided when dividing a height of a current picture.

For example, when a value of num_exp_tile_rows_minus1 is 0, it may mean that division for a height of a picture is performed based on equal division. When a value of num_exp_tile_rows_minus1 is 1, it may mean that tiles from the first tile to the second tile in the top-to-bottom direction are configured through unequal division, and the remaining tiles including the third tile are configured through equal division.

Alternatively, num_exp_tile_rows_minus1 may indicate the number of heights of tiles until the tiles are equally divided based on a bottom-to-top direction.

For example, when a value of num_exp_tile_rows_minus1 is 0, it may mean that division for a height of a picture is performed based on equal division. When a value of num_exp_tile_rows_minus1 is 1, it may mean that tiles from the first tile to the second tile in the bottom-to-top direction are configured through unequal division, and the remaining tiles including the third tile are configured through equal division.

tile_column_width_minus1[i] may indicate a width of a i-th tile, and tile_row_height_minus1[i] may indicate a height of a i-th tile.

In encoding/decoding of tile division information, encoding/decoding of some syntax elements may be omitted. When tile division information of a current picture is encoded/decoded as information on the number of tiles that are explicitly transmitted, encoding/decoding of information on a height/width of each tile may be omitted.

For example, when a picture is not divided into a plurality of tiles, encoding/decoding of information on the size of a tile with respect to an undivided side may be omitted.

In this case, the number of tiles that are explicitly transmitted may be encoded/decoded into num_exp_tile_columns and num_exp_tile_rows. When num_exp_tile_columns is 0, it may mean that a column of a picture is not divided into tiles, and encoding/decoding of information on the tile width may be omitted. When num_exp_tile_rows is 0, it may mean that a row of a picture is not divided into tiles, and encoding/decoding of information on a tile height may be omitted.

In this case, a syntax structure to be encoded/decoded may be expressed as shown in Table 16.

TABLE 16

| | Descriptor |
|---|---|
| pic_parameter_set_rbsp( ) { | |
| ... | |
| no_pic_partition_flag | u(1) |
| if( !no_pic_partition_flag ) { | |
| pps_log2_ctu_size_minus5 | u(2) |
| num_exp_tile_columns | ue(v) |
| num_exp_tile_rows | ue(v) |
| for( i = 0; i < num_exp_tile_columns; i++ ) | |
| tile_column_width_minus1[ i ] | ue(v) |
| for( i = 0; i < num_exp_tile_rows; i++ ) | |
| tile_row_height_minus1[ i ] | ue(v) |
| ... | |

In this case, the size of a tile in which encoding/decoding is omitted may be derived from the size of a picture as shown in Table 17.

TABLE 17

The variable NumTileColumns, specifying the number of tile columns, and the list colWidth[ i ] for i ranging from 0 to NumTileColumns − 1, inclusive, specifying the width of the i-th tile column in units of CTBs, are derived as follows:remainingWidthInCtbsY = PicWidthInCtbsYif( num_exp_tile_columns == 0) {NumTileColumns = 0colWidth[ 0 ] = PicWidthInCtbsY}else{for( i = 0; i < num_exp_tile_columns ; i++ ) {colWidth[ i ] = tile_column_width_minus1[ i ] + 1remainingWidthInCtbsY −= colWidth[ i ]{uniformTileColWidth = tile_column_width_minus1[ num_exp_tile_columns ] + 1while( remainingWidthInCtbsY >= uniformTileColWidth ) {colWidth[ i++ ] = uniformTileColWidthremainingWidthInCtbsY −= uniformTileColWidth}if( remainingWidthInCtbsY > 0 )colWidth[ i++ ] = remainingWidthInCtbsYNumTileColumns = i}The variable NumTileRows, specifying the number of tile rows, and the list RowHeight[ j ] for j ranging from 0 to NumTileRows − 1, inclusive, specifying the height of the j-th tile row in units of CTBs, are derived as follows:remainingHeightInCtbsY = PicHeightInCtbsYif ( num_exp_tile_rows == 0) {NumTileRows = 0RowHeight [ 0 ] = PicHeightInCtbsY}else{for( i = 0; i < num_exp_tile_rows; i++ ) {RowHeight [ i ] = tile_row_height_minus1[ i ] + 1remainingHeightInCtbsY −= RowHeight [ i ]}uniformTileRowHeight = tile_row_height_minus1[ num_exp_tile_rows ] + 1while( remainingHeightInCtbsY >= uniformTileRowHeight ) {RowHeight [ i++ ] = uniformTileRowHeightremainingHeightInCtbsY −= uniformTileRowHeight}if( remainingHeightInCtbsY > 0 )RowHeight [ i++ ] = remainingHeightInCtbsYNumTileRows = i}

In performing brick division on a current image as in [D1-3], at least one of horizontal division and vertical division may be performed. For example, in performing brick division on a current image, only horizontal or vertical division may be performed.

For example, when performing horizontal brick division on a current image, when at least one of equal division and unequal division is performed, brick division information may be encoded/decoded in a PPS as shown in Table 18.

TABLE 18

|  | Descriptor |
|---|---|
| pic_parameter_set_rbsp( ) { |  |
| pps_pic_parameter_set_id | ue(v) |
| pps_seq_parameter_set_id | ue(v) |
| ... |  |
| uniform_brick_spacing_flag[ i ] | u(1) |
| ... |  |
| if( uniform_brick_spacing_flag[ i ] ) |  |
| brick_height_minus1[ i ] | ue(v) |
| else { |  |
| num_brick_rows_minus2[ i ] | ue(v) |
| for( j = 0; j <= num_brick_rows_minus2[ i ]; j++ ) |  |
| brick_row_height_minus1[ i ] [ j ] | ue(v) |
| } |  |
| ... |  |
| } |  |

Herein, num_brick_rows_minus2 may mean the number of bricks included in the current image and divided in a horizontal direction. The current image may mean a picture, a slice, or a tile. brick_height_minus1 may indicate a height of a brick according to equal division. brick_rows_height_minus1 may indicate a height of a brick according to unequal division.

The height information may be signaled in a unit of 2 to the power of n, CTB size (width, height). In this case, n may be an integer having a value of 0 or more. For example, brick_height_minus1 may be transmitted in CTB units with a height of 128. For example, brick_height_minus1 may be transmitted in CTB units with a height of 64. For example, brick_height_minus1 may be transmitted in CTB units with a height of 32. For example, brick_height_minus1 may be transmitted in CTB units with a height of 16. brick_height_minus1 may be transmitted in CTB units with a height of 8. For example, brick_rows_height_minus1 may be transmitted in CTB units having a height of 128. For example, brick_rows_height_minus1 may be transmitted in CTB units having a height of 64. For example, brick_rows_height_minus1 may be transmitted in CTB units having a height of 32. For example, brick_rows_height_minus1 may be transmitted in CTB units having a height of 16. For example, brick_rows_height_minus1 may be transmitted in CTB units having a height of 8.

brick_rows_height_minus1 may be replaced with brick_rows_height_delta. The brick_rows_height_delta may mean a difference between a height of a current brick and a height of a previous brick. Herein, a previous brick may mean a brick belonging to a left brick column or a top brick row with respect to a current brick. A previous brick may mean a brick having a coding order (or scan order) prior to a current brick. Alternatively, a previous brick may be limited to belonging to a different tile from a current brick, or may be limited to belonging to the same tile.

The difference may be positive, negative or zero. When the difference is 0, information on a sign may not be transmitted. When the difference is positive or negative, the corresponding information may be informed using one flag. The flag may be named as sign_brick_rows_height_delta.

For example, in performing horizontal brick division on a current image, if only equal division is performed, brick division information may be encoded/decoded in a PPS only by a height of a brick as shown in Table 19.

TABLE 19

|  | Descriptor |
|---|---|
| pic_parameter_set_rbsp( ) { |  |
| pps_pic_parameter_set_id | ue(v) |
| pps_seq_parameter_set_id | ue(v) |
| ... |  |
| brick_height_minus1[ i ] [ j ] | ue(v) |
| ... |  |
| } |  |

Herein, brick_height_minus1 may indicate a height of a brick. For example, when performing brick division on a current image, only vertical division may be performed. For example, when performing vertical brick division on a current image, when at least one of equal division or unequal division is performed, brick division information may be encoded/decoded in a PPS as shown in Table 20.

TABLE 20

|  | Descriptor |
|---|---|
| pic_parameter_set_rbsp( ) { |  |
| pps_pic_parameter_set_id | ue(v) |
| pps_seq_parameter_set_id | ue(v) |
| ... |  |
| uniform_brick_spacing_flag[ i ] | u(1) |
| ... |  |
| if( uniform_brick_spacing_flag[ i ] ) |  |
| brick_width_minus1[ i ] | ue(v) |
| else { |  |
| num_brick_cols_minus2[ i ] | ue(v) |
| for( j = 0; j <= num_brick_cols_minus2[ i ]; j++ ) |  |
| brick_col_width_minus1[ i ] [ j ] | ue(v) |
| } |  |
| ... |  |
| } |  |

Herein, num_brick_cols_minus2 may indicate the number of bricks included in a current image width and divided in a vertical direction. brick_width_minus1 may indicate a width of a brick according to equal division. brick_cols_width_minus1 may indicate a width of a brick according to unequal division. The width information may be signaled in a unit of 2 to the power of n, CTB size (width, height). In this case, n may be an integer having a value of 0 or more. For example, brick_cols_width_minus1 may be transmitted in CTB units having a width of 128. For example, brick_cols_width_minus1 may be transmitted in CTB units having a width of 64. For example, brick_cols_width_minus1 may be transmitted in CTB units having a width of 32. For example, brick_cols_width_minus1 may be transmitted in CTB units having a width of 16. For example, brick_cols_width_minus1 may be transmitted in CTB units having a width of 8. For example, brick_width_minus1 may be transmitted in CTB units with a width of 128. For example, brick_width_minus1 may be transmitted in CTB units with a width of 64. For example, brick_width_minus1 may be transmitted in CTB units with a width of 32. brick_width_minus1 may be transmitted in CTB units with a width of 16. For example, brick_width_minus1 may be transmitted in CTB units with a width of 8.

Herein, brick_cols_width_minus1 may be replaced with brick_cols_width_delta. The brick_cols_width_delta may mean a difference between a width of a current brick and a width of a previous brick. Herein, a previous brick may mean a brick belonging to a left brick column or a top brick row with respect to a current brick. A previous brick may mean a brick having a coding order (or scan order) prior to a current brick. Alternatively, the previous brick may be limited to belonging to a different tile from the current brick, or may be limited to belonging to the same tile.

The difference may be positive, negative or zero. When the difference is 0, information on a sign may not be transmitted. When the difference is positive or negative, the corresponding information may be informed using one flag. The flag may be named as sign_brick_cols_width_delta.

For example, when performing vertical brick division on a current image, if only equal division is performed, as shown in Table 21, brick division information may be encoded/decoded in a PPS only by a width of a brick.

TABLE 21

|  | Descriptor |
| --- | --- |
| pic_parameter_set_rbsp( ) { | |
| pps_pic_parameter_set_id | ue(v) |
| pps_seq_parameter_set_id | ue(v) |
| . . . | |
| brick_col_width_minus1[ i ][ j ] | ue(v) |
| . . . | |
| } | |

Herein, brick_width_minus1 may indicate a width of a brick. For example, in performing brick division on a current image, horizontal and vertical division may be performed.

For example, in performing horizontal and vertical brick division on a current image, if at least one of equal division or unequal division is performed, brick division information may be encoded/decoded in a PPS as shown in Table 22.

TABLE 22

|  | Descriptor |
| --- | --- |
| pic_parameter_set_rbsp( ) { | |
| pps_pic_parameter_set_id | ue(v) |
| pps_seq_parameter_set_id | ue(v) |
| . . . | |
| uniform_brick_spacing_flag[ i ] | u(1) |
| . . . | |
| if( uniform_brick_spacing_flag[ i ] ) | |
| brick_height_minus1[ i ] | ue(v) |
| brick_width_minus1[ i ] | ue(v) |
| else { | |
| num_brick_cols_minus2[ i ] | ue(v) |
| num_brick_rows_minus2[ i ] | ue(v) |
| for( j = 0; j <= num_brick_cols_minus2[ i ]; j ++ ) | |
| brick_col_width_minus1[ i ][ j ] | ue(v) |
| brick_row_height_minus1[ i ][ j ] | ue(v) |
| } | |
| . . . | |
| } | |

Herein, brick_height_minus1 may indicate a height of a brick according to equal division, and brick_width_minus1 may indicate a width of a brick according to equal division. num_brick_rows_minus2 may indicate the number of bricks included in a current image and divided in a horizontal direction. num_brick_rows_minus2 may be coded as a value obtained by subtracting 2 from the number of bricks. Alternatively, num_brick_rows_minus4 may be encoded/decoded, which may be encoded as a value obtained by subtracting 4 from the number of bricks. num_brick_cols_minus2 may indicate the number of bricks included in the current image and divided in the vertical direction.

brick_rows_height_minus1 may indicate a height of a brick according to unequal division, and brick_cols_width_minus1 may indicate a width of a brick according to unequal division.

The height and width information may be signaled in a unit of 2 to the power of n, CTB size (width, height). In this case, n may be an integer having a value of 0 or more. For the height and width information, an example of performing a vertical brick or a horizontal brick may be used in the same manner.

brick_cols_width_minus1 may be replaced with brick_cols_width_delta. The brick_cols_width_delta may mean a difference between a width of a current brick and a width of a previous brick. Herein, a previous brick may mean a brick belonging to a left brick column or a top brick row with respect to a current brick. A previous brick may mean a brick having a coding order (or scan order) prior to a current brick. Alternatively, a previous brick may be limited to belonging to a different tile from a current brick, or may be limited to belonging to the same tile.

The difference may be positive, negative or zero. When the difference is 0, information on a sign may not be transmitted. When the difference is positive or negative, the corresponding information may be informed using one flag. The flag may be named sign_brick_cols_width_delta.

In addition, brick_rows_height_minus1 may be replaced with brick_rows_height_delta. The brick_rows_height_delta may mean a difference between a height of a current brick and a height of a previous brick. Herein, a previous brick may mean a brick belonging to a left brick column or a top brick row with respect to a current brick. A previous brick may mean a brick having a coding order (or scan order) prior to a current brick. Alternatively, a previous brick may be limited to belonging to a different tile from a current brick, or may be limited to belonging to the same tile.

The difference may be positive, negative or zero. When the difference is 0, information on a sign may not be transmitted. When the difference is positive or negative, the corresponding information may be informed using one flag. The flag may be named sign_brick_rows_height_delta.

For example, in performing horizontal and vertical brick division on a current image, when only equal division is performed, as shown in Table 23, brick division information may be encoded/decoded in a PPS only by a height and a width of a brick.

TABLE 23

|  | Descriptor |
| --- | --- |
| pic_parameter_set_rbsp( ) { | |
| pps_pic_parameter_set_id | ue(v) |
| pps_seq_parameter_set_id | ue(v) |
| . . . | |
| brick_row_height_minus1[ i ][ j ] | ue(v) |
| brick_col_width_minus1[ i ][ j ] | ue(v) |
| . . . | |
| } | |

Herein, brick_height_minus1 may indicate a height of a brick, and brick_width_minus1 may indicate a width of a brick, respectively. As in [D1-3], when performing brick division on a current image, it is possible to encode/decode all information without considering conditions. Alternatively, in performing brick division on a current image as in [D1-3], encoding/decoding of specific information may not be performed in consideration of a condition according to information of a higher parameter set. Herein, the minimum unit of a brick size may be set to 2 to the power of n, a CTB size (at least one of a width or a height), and may be encoded/decoded in a higher parameter set.

A condition in which a brick may be divided may be defined as a tile having a size of (minimum unit of brick)*m or more. m may be a positive number greater than one. A brick division flag may not be encoded/decoded with respect to a tile having a size smaller than the above condition.

A condition in which a brick may be equally divided may be defined as a tile having a size of (minimum unit of a brick)*n or more. n may be a positive number greater than two. For a tile having a size smaller than the above condition, a brick equal division flag may not be encoded/decoded.

The size of the condition means at least one of a width or a height, and the same applies in examples to be described later. The minimum size allowed for brick division may be 128, 256, 384, 512 or more. In this case, the minimum size may be encoded and signaled by an encoder, or may be a fixed value pre-defined in a decoder. Alternatively, the minimum size may be variably determined according to a picture, tile, or slice size/shape. The above-described information on the minimum size is not limited to brick division, and may be equally/similarly applied to a tile, a slice, and the like.

In encoding/decoding brick division information (or slice division information), it is possible to reduce bits by not deriving or transmitting specific information without parsing a dependency using signaled higher division information.

In performing brick division on a current image as in [D1-3], encoding/decoding of specific information may not be performed in consideration of a condition according to information of the same parameter set. Herein, in checking a condition of brick division, information signaled according to equal division or unequal division may be used.

A condition in which a brick can be divided may be defined as a tile having a size of (minimum unit of brick)*m or more. m may be a positive number greater than one.

For example, tile_height_minus1 may indicate a width of a tile according to equal division, and when the information is smaller than the minimum division condition, encoding/decoding of information may not be performed. tile_width_minus1 may indicate a height of a tile according to equal division, and when the information is smaller than the minimum division condition, encoding/decoding of information may not be performed. tile_rows_height_minus1 may indicate a width of a tile according to unequal division, and when the information is smaller than the minimum division condition, encoding/decoding of information may not be performed. tile_cols_width_minus1 may indicate a height of a tile according to unequal division, and when the information is smaller than the minimum division condition, encoding/decoding of information may not be performed.

A condition in which a brick can be equally divided may be defined as a tile having a size of (minimum unit of a brick)*n or more. n may be a positive number greater than two.

For example, tile_height_minus1 may indicate a width of a tile according to equal division, and when the information is smaller than the minimum division condition, encoding/decoding of information may not be performed. tile_width_minus1 may a height of a tile according to equal division, and when the information is smaller than the minimum division condition, encoding/decoding of information may not be performed. tile_rows_height_minus1 may indicate a width of a tile according to unequal division, and when the information is smaller than the minimum division condition, encoding/decoding of information may not be performed. tile_cols_width_minus1 may indicate a height of a tile according to unequal division, and when the information is smaller than the minimum division condition, encoding/decoding of information may not be performed.

Using information transmitted for tile division, information on the number of tiles in a picture for division of a brick (or slice) for each tile may be implicitly derived, and transmission of separate information on the number may be omitted.

Herein, information on a width and a height of a picture and CTB size information may be transmitted in the same parameter set as a brick (or slice). For example, information on a width and a height of a picture and CTB size information may be transmitted in a PPS in the same way as brick information (or slice). However, the present disclosure is not limited thereto, and may be transmitted at a higher level than a PPS (e.g., a decoding parameter set, a video parameter set). Alternatively, information on a width and a height of a picture, CTB size information, and the like may be transmitted at two or more higher levels, respectively.

The number of tiles belonging to a picture may be derived using at least one of information used for tile division, information on a width and a height of a picture, and CTB size information, and may be derived as follows. Alternatively, the number of tiles belonging to a picture may be derived using the unit information of the sub-picture described above.

NumTilesInPic may mean the number of tiles belonging to a picture.

Num TilesInPic = (uniform_tile_spacing_flag=0?)? (num_tile_row_minus1+1) * (num_tile_columns_minus1+1) : Ceil((size of picture width/size of CTB)/(tile_columns_width_minus1+1))*Ceil((size of picture height/size of CTB)/(tile_rows_height_minus1+1)).

Using the derived number of tiles, information on whether brick (or slice) division is performed for each tile may be encoded/decoded.

In the above embodiment, a CTB size is a CBT size pre-defined in the encoding/decoding device, the minimum CTB size or the maximum CTB size allowed in an encoding/decoding device, any of a fixed value or signaled size information may be replaced by one.

Alternatively, tile division information may be signaled based on the total number of tiles belonging to a picture. The total number of tiles may be one, two, or more, and when the total number is two or more, information on the total number may be signaled as a value obtained by subtracting 2 from the total number. In this case, information on the total number may be signaled by being divided into the number of widths and the number of heights.

When performing slice division on a current image as in [D1-4], when all one brick is considered as a slice, as shown in Table 24, slice division information may be encoded/decoded in a PPS.

TABLE 24

| | Descriptor |
|---|---|
| pic_parameter_set_rbsp( ) { | |
| . . . | |
| pps_pic_parameter_set_id | ue(v) |
| pps_seq_parameter_set_id | ue(v) |
| . . . | |
| single_brick_in_pic_flag | u(1) |
| . . . | |
| } | |

For example, as in [D1-4], when several bricks are considered as a slice in performing slice division on a current image, slice division information may be encoded/decoded in a PPS as shown in Table 25. Herein, a slice may be configured in a rectangular shape.

TABLE 25

|  | Descriptor |
| --- | --- |
| pic_parameter_set_rbsp( ) { |  |
| pps_pic_parameter_set_id | ue(v) |
| pps_seq_parameter_set_id | ue(v) |
| . . . |  |
| single_brick_per_slice_flag | u(1) |
| . . . |  |
| if( !single_brick_per_slice_flag ) |  |
| . . . |  |
| rect_slice_flag | u(1) |
| if( rect_slice_flag |  |
| && !single_brick_per_slice_flag ) { |  |
| . . . |  |
| num_slices_in_pic_minus1 | ue(v) |
| bottom_right_brick_idx_length_minus1 | ue(v) |
| for( i = 0; i < num_slices_in_pic_minus1; i++ ) { |  |
| . . . |  |
| bottom_right_brick_idx_delta[ i ] | se(v) |
| brick_idx_delta_sign_flag[ i ] |  |
| . . . |  |
| } |  |
| } |  |

Herein, num_slices_in_pic_minus1 may indicate the number of slices in a picture. bottom_right_brick_idx_length_minus1 may mean the number of bricks in a picture. bottom_right_brick_idx_delta may indicate an index difference between a bottom-right brick in a current slice and a bottom-right brick in a previous slice. The index may mean a scan order of bricks. brick_idx_delta_sign_flag may mean a sign for bottom_right_brick_idx_delta. In the case of the first and last slices, as shown in Table 25, encoding/decoding of signs for bottom_right_brick_idx may not be performed. The signs of bottom_right_brick_idx for the first and last slices may be always positive or always negative. As in [D1-4], when all one tile is regarded as a slice in performing slice division on a current image, slice division information may be encoded/decoded in a PPS as shown in Table 26.

TABLE 26

|  | Descriptor |
| --- | --- |
| pic_parameter_set_rbsp( ) { |  |
| . . . |  |
| pps_pic_parameter_set_id | ue(v) |
| pps_seq_parameter_set_id | ue(v) |
| . . . |  |
| single_tile_in_pic_flag | u(1) |
| . . . |  |
| } |  |

For example, as in [D1-4], when multiple tiles are regarded as a slice in performing slice division on a current image, slice division information may be encoded/decoded in a PPS as shown in Table 27. Herein, the slice may have a rectangular shape.

TABLE 27

|  | Descriptor |
| --- | --- |
| pic_parameter_set_rbsp( ) { |  |
| pps_pic_parameter_set_id | ue(v) |
| pps_seq_parameter_set_id | ue(v) |
| . . . |  |
| single_tile_per_slice_flag | u(1) |
| . . . |  |
| if( !single_tile_per_slice_flag ) |  |
| . . . |  |
| rect_slice_flag | u(1) |
| if( rect_slice_flag && !single_tile |  |
| _per_slice_flag ) { |  |
| . . . |  |
| num_slices_in_pic_minus1 | ue(v) |
| bottom_right_tile_idx_length_minus1 | ue(v) |
| for( i = 0; i < num_slices_in_pic_minus1; i++ ) { |  |
| . . . |  |
| bottom_right_tile_idx_delta[ i ] | se(v) |
| tile_idx_delta_sign_flag[ i ] | u(1) |
| . . . |  |
| } |  |
| } |  |

Herein, num_slices_in_pic_minus1 may indicate the number of slices in a picture. bottom_right_tile_idx_length_minus1 may indicate the number of tiles in a picture. bottom_right_tile_idx_delta may mean an index difference between a bottom-right tile in a current slice and a bottom-right tile in a previous slice. The index may mean a scan order of tiles. However, a bottom-right tile is only an example, and an index of a top-left tile including the first CTB of a slice may be used. tile_idx_delta_sign_flag may mean a sign of bottom_right_tile_idx_delta. The position of a current slice may be specified based on at least one of an index of a bottom-right tile in a previous slice, bottom_right_tile_idx_delta, or tile_idx_delta_sign_flag. However, with respect to the first slice and the last slice in a picture, signs for bottom_right_tile_idx may not be encoded/decoded as shown in Table 28. Signs of bottom_right_tile_idx for the first and last slices may be always positive or always negative.

TABLE 28

|  | Descriptor |
| --- | --- |
| pic_parameter_set_rbsp( ) { |  |
| pps_pic_parameter_set_id | ue(v) |
| pps_seq_parameter_set_id | ue(v) |
| . . . |  |
| single_tile_per_slice_flag | u(1) |
| . . . |  |
| if( !single_tile_per_slice_flag ) |  |
| . . . |  |
| rect_slice_flag | u(1) |
| if( rect_slice_flag |  |
| && !single_tile_per_slice_flag ) { |  |
| . . . |  |
| num_slices_in_pic_minus1 | ue(v) |
| bottom_right_tile_idx_length_minus1 | ue(v) |
| for( i = 0; i < num_slices_in_pic_minus1; i++ ) { |  |
| . . . |  |
| bottom_right_tile_idx_delta[ i ] | se(v) |
| if(i !=0 && i < num_slices_in_pic_minus1−1) |  |
| tile_idx_delta_sign_flag[ i ] | u(1) |
| . . . |  |
| } |  |

In performing slice division on a current image as in [D1-4], slice division information may be encoded/decoded from a tile in a PPS as shown in Table 29.

TABLE 29

| | Descriptor |
|---|---|
| pic_parameter_set_rbsp( ) { | |
| pps_pic_parameter_set_id | ue(v) |
| pps_seq_parameter_set_id | ue(v) |
| . . . | |
| rect_slice_flag | u(1) |
| if( rect_slice_flag ) | |
| single_slice_per_subpic_flag | u(1) |
| if( rect_slice_flag | |
| && !single_slice_per_subpic_flag ) { | |
| num_slices_in_pic_minus1 | ue(1) |
| tile_idx_delta_present_flag | u(1) |
| for( i = 0; i < num_slices_in_pic_minus1; i++ ) { | |
| slice_width_in_tiles_minus1[ i ] | ue(v) |
| slice_height_in_tiles_minus1[ i ] | ue(v) |
| if( slice_width_in_tiles_minus1[ i ] = = 0 | |
| &&slice_height_in_tiles_minus1[ i ] = = 0 ) { | |
| num_slices_in_tile_minus1[ i ] | ue(v) |
| numSlicesInTileMinus1 = | |
| num_slices_in_tile_minus1[ i ] | |
| for( j = 0; j < numSlicesInTileMinus1; j++ ) | |
| slice_height_in_ctu_minus1[ i++ ] | ue(v) |
| } | |
| if( tile_idx_delta_present_flag && i < | |
| num_slices_in_pic_minus1 ) | |
| tile_idx_delta[ i ] | se(v) |
| } | |
| } | |

Figures 7A, 7B:
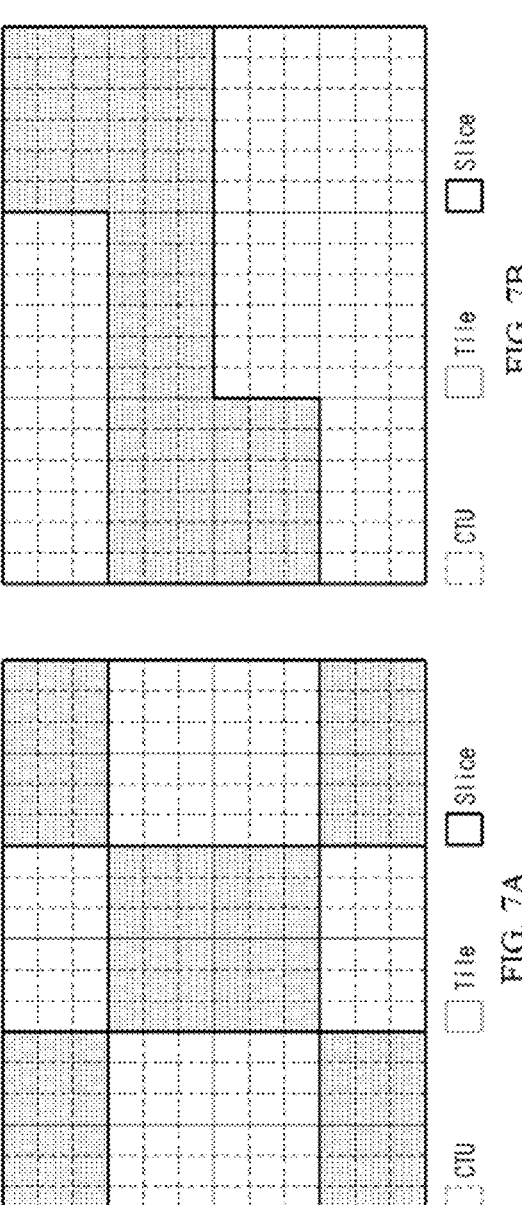
FIG. 7A illustrates a case in which a slice is configured in a rectangular mode.
FIG. 7B illustrates an example when a slice is configured in a raster scan mode.

In performing slice division, a single slice may include a plurality of tiles, and one or more slices may be configured within a single tile. Herein, rect_slice_flag may indicate whether a structure of a slice is divided into a rectangular shape. For example, when rect_slice_flag is 1, it may mean that a slice is configured in a rectangular mode, and when rect_slice_flag is 0, it may mean that a slice is configured in a raster scan mode. FIG. 7A shows a case in which a slice is configured in a rectangular mode, and FIG. 7B shows an example when a slice is configured in a raster scan mode.

Herein, single_slice_per_subpic_flag may indicate whether each sub-picture consists of only one slice. For example, when single_slice_per_subpic_flag is 1, each sub-picture may consist of only one slice, and when single_slice_per_subpic_flag is 0, each sub-picture may consist of one or more slices. Herein, the slice may mean a slice in a rectangular mode. That is, single_slice_per_subpic_flag may be signaled only when rect_slice_flag is 1.

When a sub-picture consists of only one slice, the size of a slice is determined according to the size information of the sub-picture described above, and information for slice division may not be separately encoded/decoded. On the other hand, when a sub-picture is divided into a plurality of slices, division information for a slice may be encoded/decoded.

Specifically, num_slices_in_pic_minus1 may indicate the number of slices belonging to one picture.

The tile_idx_delta_present_flag may indicate whether tile_idx_delta exists. tile_idx_delta may indicate a difference between an index of a tile including a top-left CTB in a next slice ((i+1)-th slice) and an index of a tile including a top-left CTB in a current slice (i-th slice). For example, when tile_idx_delta_present_flag is 0, tile_idx_delta does not exist, and in this case, a picture may be divided into slices in the rectangular mode according to a raster scan order. On the other hand, when tile_idx_delta_present_flag is 1, tile_idx_delta exists, and in this case, the positions of all slices in a rectangular mode belonging to a picture may be specified by tile_idx_delta.

Encoding/decoding of the syntax may be omitted according to the number of slices constituting a picture. For example, when a picture is divided into n slices, encoding/decoding of tile_idx_delta for the n-th slice may be omitted. In other words, information indicating a difference between an index of a top-left tile in the last slice and an index of a top-left tile in the last previous slice may be derived without separate transmission.

Alternatively, only when num_slices_in_pic_minus1, a syntax indicating the number of slices, is greater than 1, tile_idx_delta_present_flag may be encoded/decoded. The corresponding syntax structure may be expressed as shown in Table 30. In other words, only when the number of slices constituting a picture is greater than or equal to a predetermined threshold number (e.g., 3), tile_idx_delta_present_flag may be encoded/decoded.

TABLE 30

| | Descriptor |
|---|---|
| pic_parameter_set_rbsp( ) { | |
| . . . | |
| if( pps_num_slices_in_pic_minus1 > 1 ) | |
| pps_tile_idx_delta_present_flag | u(1) |
| . . . | |
| } | |

In Table 29, slice_width_in_tiles_minus1[i] may indicate a width of the i-th slice. In this case, transmitted slice width information may indicate the number of tile columns belonging to the i-th slice. slice_height_in_tiles_minus1[i] may indicate a height of the i-th slice. In this case, transmitted slice height information may indicate the number of tile rows belonging to the i-th slice. On the other hand, when it is determined that the size of a current slice is equal to one tile according to slice_width_in_tiles_minus1 and slice_height_in_tiles_minus1, that is, when slice_width_in_tiles_minus1 and slice_height_in_tiles_minus1 are both 0, information for dividing one tile into one or more slices may be encoded/decoded.

For example, num_slices_in_tile_minus1[i] may indicate the number of slices constituting one tile. The number of slices constituting one tile may be derived as a value obtained by adding 1 to the value of num_slices_in_tile_minus1[i]. However, the present disclosure is not limited thereto, and num_slices_in_tile[i] may be encoded/decoded. In this case, the number of slices constituting one tile may be derived as a value of num_slices_in_tile[i]. slice_height_in_ctu_minus1[i++] may indicate a height of each slice. In this case, transmitted slice height information may indicate the number of CTU rows belonging to the slice.

As in [D1-4], when performing slice division on a current image, when encoding/decoding a plurality of slice division information for a single tile, division information of some slices may be transmitted more efficiently.

As shown in Tables 31 and 32, when dividing into one or more slices within one tile, the number of slices to be divided may be explicitly transmitted.

TABLE 31

| | Descriptor |
|---|---|
| pic_parameter_set_rbsp( ) { | |
| pps_pic_parameter_set_id | ue(v) |
| pps_seq_parameter_set_id | ue(v) |
| . . . | |
| rect_slice_flag | u(1) |
| if( rect_slice_flag ) | |
| single_slice_per_subpic_flag | u(1) |

TABLE 31-continued

| | Descriptor |
|---|---|
| if( rect_slice_flag | |
| && !single_slice_per_subpic_flag ) { | |
| num_slices_in_pic_minus1 | ue(1) |
| tile_idx_delta_present_flag | u(1) |
| for( i = 0; i < num_slices_in_pic_minus1; i++ ) { | |
| slice_width_in_tiles_minus1[ i ] | ue(v) |
| slice_height_in_tiles_minus1[ i ] | ue(v) |
| if( slice_width_in_tiles_minus1[ i ] = = 0 | |
| &&slice_height_in_tiles_minus1[ i ] = = 0 ) { | |
| num_exp_slices_in_tile_minus1[ i ] | ue(v) |
| numSlicesInTileMinus1 = | |
| exp_num_slices_in_tile_minus1[ i ] | |
| for( j = 0; j <= numSlicesInTileMinus1; j++ ) | |
| slice_height_in_ctu_minus1[ i++ ] | ue(v) |
| i += (NumSlicesInTile − numSlicesInTileMinus1 | |
| + 1) | |
| } | |
| if( tile_idx_delta_present_flag && i < | |
| num_slices_in_pic_minus1 ) | |
| tile_idx_delta[ i ] | se(v) |
| } | |
| } | |

TABLE 32

| | Descriptor |
|---|---|
| pic_parameter_set_rbsp( ) { | |
| pps_pic_parameter_set_id | ue(v) |
| pps_seq_parameter_set_id | ue(v) |
| . . . | |
| rect_slice_flag | u(1) |
| if( rect_slice_flag ) | |
| single_slice_per_subpic_flag | u(1) |
| if( rect_slice_flag | |
| && !single_slice_per_subpic_flag ) { | |
| num_slices_in_pic_minus1 | ue(1) |
| tile_idx_delta_present_flag | u(1) |
| for( i = 0; i < num_slices_in_pic_minus1; i++ ) { | |
| slice_width_in_tiles_minus1[ i ] | ue(v) |
| slice_height_in_tiles_minus1[ i ] | ue(v) |
| if( slice_width_in_tiles_minus1[ i ] = = 0 | |
| &&slice_height_in_tiles_minus1[ i ] = = 0 ) { | |
| num_exp_slices_in_tile_minus1[ i ] | ue(v) |
| numExpSlicesInTile = | |
| exp_num_slices_in_tile_minus1[ i ] | |
| for( j = 0; j < numExpSlicesInTile; j++ ) | |
| slice_height_in_ctu_minus1[ j ] | ue(v) |
| i += NumSlicesInTile | |
| } | |
| if( tile_idx_delta_present_flag && i < | |
| num_slices_in_pic_minus1 ) | |
| tile_idx_delta[ i ] | se(v) |
| } | |
| } | |

For example, num_exp_slices_in_tile_minus1[i] may indicate the number of slices until a slice is divided into equal divisions based on the direction from the top to the bottom. Alternatively, num_exp_slices_in_tile_minus1[i] may indicate the number of slices until a slice is divided into equal divisions based on the direction from the bottom to the top. slice_height_in_ctu_minus1[i++] may indicate the height of each slice. In this case, transmitted slice height information may indicate the number of CTU rows belonging to a slice. For example, num_exp_slices_in_tile[i] may indicate the number of slices until a slice is divided into equal divisions based on the direction from the top to the bottom. num_exp_slices_in_tile[i] may indicate the number of slices until the slice is divided into equal based on the direction from the bottom to the top. slice_height_in_ctu_minus1[i++] may indicate a height of each slice. In this case, transmitted slice height information may indicate the number of CTU rows belonging to a slice.

When performing slice division on a current image as in [D1-4], when encoding/decoding a plurality of slice division information for a single tile, division information of some slices may be derived without separate transmission.

When one tile is divided into one or more slices, if a height of a tile is 1 in CTU unit, one tile may be one slice.

As shown in Table 33, when a height of a tile is 1, the corresponding tile may be configured as one slice without separate transmission of division information.

TABLE 33

| | Descriptor |
|---|---|
| pic_parameter_set_rbsp( ) { | |
| pps_pic_parameter_set_id | ue(v) |
| pps_seq_parameter_set_id | ue(v) |
| . . . | |
| rect_slice_flag | u(1) |
| if( rect_slice_flag ) | |
| single_slice_per_subpic_flag | u(1) |
| if( rect_slice_flag | |
| && !single_slice_per_subpic_flag ) { | |
| num_slices_in_pic_minus1 | ue(1) |
| tile_idx_delta_present_flag | u(1) |
| for( i = 0; i < num_slices_in_pic_minus1; i++ ) { | |
| slice_width_in_tiles_minus1[ i ] | ue(v) |
| slice_height_in_tiles_minus1[ i ] | ue(v) |
| if( slice_width_in_tiles_minus1[ i ] = = 0 | |
| &&slice_height_in_tiles_minus1[ i ] = = 0 && | |
| RowheightVAL[tileY] != 1 ) { | |
| num_slices_in_tile_minus1[ i ] | ue(v) |
| numSlicesInTileMinus1 = | |
| num_slices_in_tile_minus1[ i ] | |
| for( j = 0; j < numSlicesInTileMinus1; j++ ) | |
| slice_height_in_ctu_minus1[ i++ ] | ue(v) |
| } | |
| if( tile_idx_delta_present_flag && i < | |
| num_slices_in_pic_minus1 ) | |
| tile_idx_delta[ i ] | se(v) |
| } | |
| } | |

Herein, tileY may be defined as (SliceTopLeftTileIdx[i]/ NumTileColumns). In other words, tileY may be a quotient obtained by dividing an index of a current tile by the number of tile widths or the number of tile rows. RowheightVAL [tileY] may mean a height with respect to a location of a tile determined through tileY. Only when a value of Rowheight-VAL[tileY] is not 1 or when a value of RowheightVAL [tileY] is greater than 1, information indicating the number of slices constituting one tile (num_slices_in_tile_minus1) and information indicating a height of each slice (slice_height_in_ctu_minus1) may be encoded/decoded. Other division information has been described in detail with reference to Table 29, and a duplicate description thereof will be omitted. When one tile is divided into one or more slices, encoding/decoding of information indicating a height of each slice may be optionally performed based on at least one of information indicating the number of slices constituting one tile or information on a height of the corresponding tile.

For example, as shown in Table 34 or Table 35, when one tile is divided into one or more slices and height information of a tile is the same as information indicating the number of slices constituting one tile, information indicating a height of a slice may not be encoded/decoded.

Herein, height information of a tile may be defined as (RowheightVAL[tileY]−1). tileY may be a quotient of a value obtained by dividing an index of a current tile by the number of tile widths or the number of tile rows, and RowheightVAL[tileY] may mean a height with respect to a location of a tile determined through tileY.

TABLE 34

|  | Descriptor |
| --- | --- |
| pic_parameter_set_rbsp( ) { |  |
| pps_pic_parameter_set_id | ue(v) |
| pps_seq_parameter_set_id | ue(v) |
| . . . |  |
| rect_slice_flag | u(1) |
| if( rect_slice_flag ) |  |
| single_slice_per_subpic_flag | u(1) |
| if( rect_slice_flag |  |
| && !single_slice_per_subpic_flag ) { |  |
| num_slices_in_pic_minus1 | ue(1) |
| tile_idx_delta_present_flag | u(1) |
| for( i = 0; i < num_slices_in_pic_minus1; i++ ) { |  |
| slice_width_in_tiles_minus1[ i ] | ue(v) |
| slice_height_in_tiles_minus1[ i ] | ue(v) |
| if( slice_width_in_tiles_minus1[ i ] = = 0 |  |
| &&slice_height_in_tiles_minus1[ i ] = = 0 ) { |  |
| num_slices_in_tile_minus1[ i ] | ue(v) |
| numSlicesInTileMinus1 = |  |
| num_slices_in_tile_minus1[ i ] |  |
| if( numSlicesInTileMinus1 != |  |
| RowheightVAL[tileY] − 1) |  |
| for( j = 0; j < numSlicesInTileMinus1; j++ ) | ue(v) |
| slice_height_in_ctu_minus1[ i++ ] |  |
| } |  |
| if ( tile_idx_delta_present_flag && i < | se(v) |
| num_slices_in_pic_minus1 ) |  |
| tile_idx_delta[ i ] |  |
| } |  |
| } |  |

TABLE 35

|  | Descriptor |
| --- | --- |
| pic_parameter_set_rbsp( ) { |  |
| pps_pic_parameter_set_id | ue(v) |
| pps_seq_parameter_set_id | ue(v) |
| . . . |  |
| rect_slice_flag | u(1) |
| if( rect_slice_flag ) |  |
| single_slice_per_subpic_flag | u(1) |
| if( rect_slice_flag |  |
| && !single_slice_per_subpic_flag ) { |  |
| num_slices_in_pic_minus1 | ue(1) |
| tile_idx_delta_present_flag | u(1) |
| for( i = 0; i < num_slices_in_pic_minus1; i++ ) { |  |
| slice_width_in_tiles_minus1[ i ] | ue(v) |
| slice_height_in_tiles_minus1[ i ] | ue(v) |
| if( slice_width_in_tiles_minus1[ i ] = = 0 |  |
| &&slice_height_in_tiles_minus1[ i ] = = 0 ) { |  |
| num_exp_slices_in_tile_minus1[ i ] | ue(v) |
| numExpSlicesInTile = |  |
| exp_num_slices_in_tile_minus1[ i ] |  |
| for( j = 0; j < numExpSlicesInTile; j++ ) |  |
| slice_height_in_ctu_minus1[ j ] | ue(v) |
| i += NumSlicesInTile |  |
| } |  |
| if( tile_idx_delta_present_flag && i < | se(v) |
| num_slices_in_pic_minus1 ) |  |
| tile_idx_delta[ i ] |  |
| } |  |
| } |  |

A current image may be divided using the above-described high-level image division information, and a current image may be encoded/decoded by performing prediction and transformation in units of predetermined blocks. Of course, this series of processes may be performed by an encoding/decoding device to be described later.

FIG. 8 is a block diagram illustrating a configuration of a video encoding apparatus according to an embodiment of the present disclosure.

A video encoding apparatus according to an embodiment may comprise a picture division unit (not shown), an inter prediction unit 120, an intra prediction unit 125, a subtractor 130, a transform unit 140, a quantization unit 150, an entropy encoding unit 160, an inverse transform unit 145, an inverse quantization unit 155, an adder 135, a bidirectional filter unit 180, an in-loop filter unit 180, and a reconstructed picture buffer 190.

A picture division unit may divide one picture into the above-described predetermined unit and hierarchically, and encode division information for each predetermined unit.

An inter prediction unit 120 generates a prediction signal by performing motion prediction using an input image 110 and a reconstructed image stored in a reconstructed picture buffer 190.

An intra prediction unit 125 generates a prediction signal by performing spatial prediction using pixel values of pre-reconstructed neighboring blocks that are spatially adjacent to a current block to be encoded.

A subtractor 130 generates a residual signal by using an input image and a prediction signal generated by an inter prediction unit 120 or an intra prediction unit 125.

A transform unit 140 and a quantization unit 150 perform transform and quantization on a residual signal generated through a subtractor 130 to generate quantized coefficients.

An entropy encoding unit 160 outputs a bitstream by performing entropy encoding on encoding information such as syntax elements defined in a video compression standard and quantized coefficients.

An inverse transform unit 145 and an inverse quantization unit 155 receive quantized coefficients, perform inverse quantization and inverse transformation in turn, and generate a reconstructed residual signal.

An adder 135 generates a reconstructed signal by using a prediction signal generated by an inter prediction unit 120 or an intra prediction unit 125 and a reconstructed residual signal.

The reconstructed signal is transmitted to an in-loop filter unit 180 and applied to one or more in-loop filters such as a deblocking filter, sample adaptive offset (SAO), and adaptive loop filter (ALF) to generate a final reconstructed picture and stored in the reconstructed picture buffer 190.

A reconstructed picture stored in the reconstructed picture buffer 190 may be used as a reference picture in an inter prediction unit 120.

FIG. 9 is a block diagram illustrating a configuration of a video decoding apparatus according to an embodiment of the present disclosure.

A video decoding apparatus according to an embodiment may comprise an entropy decoding unit 210, an inverse quantization unit 220, an inverse transform unit 230, an intra prediction unit 240, an inter prediction unit 250, an adder 260, a bidirectional filter unit 270, an in-loop filter unit 280, and a reconstructed picture buffer 290.

An entropy decoding unit 210 decodes the input bitstream 200 and outputs decoding information such as syntax elements and quantized coefficients. Herein, decoding information may include division information for each of the above-described predetermined units, and division information may be used to divide a current picture into the above-described predetermined units.

An inverse quantization unit 220 and an inverse transform unit 230 receive quantization coefficients, sequentially perform inverse quantization and inverse transformation, and output a residual signal.

An intra prediction unit 240 generates a prediction signal by performing spatial prediction using pixel values of a pre-decoded neighboring block adjacent to a current block to be decoded.

An inter prediction unit 250 generates a prediction signal by performing motion compensation using a motion vector extracted from a bitstream and a reconstructed image stored in a reconstructed picture buffer 280.

An adder 260 generates a reconstructed signal by using a prediction signal generated by an intra prediction unit 240 or an inter prediction unit 250 and a reconstructed residual signal.

An bidirectional filter unit 270 generates a signal to which a filter is applied by performing a bidirectional filter on a reconstructed signal generated through an adder 260.

The reconstructed signal is transmitted to an in-loop filter unit 270 and applied to one or more in-loop filters such as a deblocking filter, sample adaptive offset (SAO), and adaptive loop filter (ALF) to generate a final reconstructed picture and stored in a reconstructed picture buffer 280.

A reconstructed picture stored in the reconstructed picture buffer 280 may be used as a reference picture in an inter prediction unit 250.

INDUSTRIAL APPLICABILITY

The present disclosure may be used to encode/decode a video signal.

The invention claimed is:

1. An image decoding method, comprising:
decoding division information for a current picture from a bitstream; and
dividing the current picture into at least one unit of a sub-picture, a slice, or a tile by using the decoded division information,
wherein the division information includes at least one of sub-picture division information, slice division information, or tile division information,
wherein decoding the slice division information comprises:
obtaining a fifth flag indicating whether a slice is divided in a rectangular mode or a raster scan mode;
obtaining, based on the fifth flag, information indicating a number of slices belonging to the current picture; and
obtaining, based on the information indicating the number of the slices belonging to the current picture, information indicating a width and a height of each slice,
wherein, in response to a height of an [SliceTopLeftTileIdx[i]/NumTileColumns]-th tile row being greater than 1, information indicating a height of each slice within a tile composed of a plurality of slices is adaptively decoded based on the information indicating a width and a height of each slice, and
wherein the bitstream includes a video parameter set (VPS), a picture parameter set (PPS), and a sequence parameter set (SPS).

2. The method of claim 1, wherein decoding the sub-picture division information comprises:
obtaining a first flag indicating whether the current picture consists of only one sub-picture; and
obtaining, based on the first flag, at least one of information indicating a number of sub-pictures constituting the current picture or a second flag indicating whether the sub-pictures are equally divided, and
wherein the sub-picture is composed of a plurality of coding tree blocks (CTBs).

3. The method of claim 2, wherein decoding the sub-picture division information further comprises:
obtaining information indicating a size of each sub-picture constituting the current picture based on at least one of the information indicating the number of the sub-pictures or the second flag indicating whether the sub-pictures are equally divided,
wherein the information indicating the size of the each sub-picture is decoded in units of a size of a coding tree block (CTB) predefined in a decoding apparatus.

4. The method of claim 1, wherein the sub-picture division information is obtained from the sequence parameter set (SPS), and
wherein the sub-picture is composed of a plurality of coding tree blocks (CTBs).

5. The method of claim 1, wherein decoding the tile division information comprises:
obtaining a third flag indicating whether division is performed on the current picture, wherein when a value of the third flag is 1, the division is not performed on the current picture, and when the value of the third flag is 0, the current picture is divided into a plurality of tiles or slices;
obtaining, based on the third flag, information on a number of tile row widths constituting the current picture and information on the number of tile column heights constituting the current picture; and
obtaining, based on the obtained information, information indicating a width and a height of each tile.

6. The method of claim 5, wherein the tile division information is obtained from the picture parameter set (PPS).

7. The method of claim 1, wherein decoding the slice division information further comprises:
obtaining information indicating a difference between an index of a tile including a top-left CTB in a next slice and an index of a tile including a top-left CTB in a current slice,
wherein a tile index is determined based on the information indicating the difference, and
wherein a position of the slice is specified based on the tile index.

8. The method of claim 7, wherein the information indicating the difference is decoded only for some slices among a plurality of slices constituting the current picture.

9. The method of claim 7, wherein the information indicating the difference is decoded based on a fourth flag indicating whether the information indicating the difference exists,
wherein the fourth flag is decoded only when a number of the slices constituting the current picture is greater than or equal to a predetermined threshold number.

10. An image encoding method, comprising:
dividing a current picture into units of at least one of a sub-picture, a slice, or a tile; and
encoding division information for division of the current picture,
wherein the division information includes at least one of sub-picture division information, slice division information, or tile division information,
wherein a fifth flag of the slice division information indicating whether a slice is divided in a rectangular mode or a raster scan mode is encoded, wherein, based on whether the slice is divided in the rectangular mode or the raster scan mode, information indicating a number of slices belonging to the current picture is encoded, wherein, based on the number of slices belonging to the current picture, information indicating a width and a height of each slice is encoded, wherein, in response to a height of an [SliceTopLeftTileIdx[i]/NumTileColumns]-th tile row being greater than 1, information indicating a height of each slice within a tile composed of a plurality of slices is adaptively encoded based on the width and the height of each slice, and wherein the bitstream includes a video parameter set (VPS), a picture parameter set (PPS), and a sequence parameter set (SPS).

11. A method of transmitting a bitstream generated by an encoding method, the encoding method comprising:

dividing a current picture into units of at least one of a sub-picture, a slice, or a tile;

encoding division information for division of the current picture into the bitstream; and transmitting the bitstream, wherein the division information includes at least one of sub-picture division information, slice division information, or tile division information, wherein a fifth flag of the slice division information indicating whether a slice is divided in a rectangular mode or a raster scan mode is encoded into the bitstream, wherein, based on whether the slice is divided in the rectangular mode or the raster scan mode, information indicating a number of slices belonging to the current picture is encoded into the bitstream, wherein, based on the number of slices belonging to the current picture, information indicating a width and a height of each slice is encoded into the bitstream, wherein, in response to a height of an [SliceTopLeftTileIdx[i]/NumTileColumns]-th tile row being greater than 1, information indicating a height of each slice within a tile composed of a plurality of slices is adaptively encoded into the bitstream based on the width and the height of each slice, and wherein the bitstream includes a video parameter set (VPS), a picture parameter set (PPS), and a sequence parameter set (SPS).

* * * * *